US008824062B2

(12) United States Patent
Aoi et al.

(10) Patent No.: US 8,824,062 B2
(45) Date of Patent: Sep. 2, 2014

(54) ZOOM LENS AND IMAGING APPARATUS

(71) Applicant: FUJIFILM Corporation, Tokyo (JP)

(72) Inventors: Toshihiro Aoi, Saitama-ken (JP); Shinkichi Ikeda, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/903,316

(22) Filed: May 28, 2013

(65) Prior Publication Data
US 2013/0258497 A1 Oct. 3, 2013

Related U.S. Application Data

(63) Continuation of application No. PCT/JP2011/007007, filed on Dec. 15, 2011.

(30) Foreign Application Priority Data

Dec. 16, 2010 (JP) ................. 2010-280516

(51) Int. Cl.
*G02B 15/14* (2006.01)
*G02B 13/18* (2006.01)
*G02B 3/02* (2006.01)
*G02B 15/17* (2006.01)
*G02B 15/26* (2006.01)

(52) U.S. Cl.
CPC ............... *G02B 15/14* (2013.01); *G02B 15/17* (2013.01); *G02B 15/26* (2013.01)
USPC .......................................... 359/688; 359/715

(58) Field of Classification Search
USPC ........................... 359/688, 693, 715
See application file for complete search history.

(56) References Cited

U.S. PATENT DOCUMENTS

| 5,579,172 | A | 11/1996 | Aoki et al. |
| 5,995,297 | A | 11/1999 | Usui |
| 6,002,528 | A | 12/1999 | Tomita |
| 2009/0279185 | A1 | 11/2009 | Mihara et al. |
| 2010/0123957 | A1 | 5/2010 | Miyano |

FOREIGN PATENT DOCUMENTS

| JP | S63-183413 | 7/1988 |
| JP | H03-261906 | 11/1991 |
| JP | H07-35976 | 2/1995 |
| JP | H07-35977 | 2/1995 |
| JP | H10-282419 | 10/1998 |
| JP | 2000-221402 | 8/2000 |
| JP | 2003-107345 | 4/2003 |
| JP | 2003-287678 | 10/2003 |
| JP | 2005-084409 | 3/2005 |
| JP | 2007-108702 | 4/2007 |
| JP | 2010-122423 | 6/2010 |

*Primary Examiner* — Alicia M Harrington
(74) *Attorney, Agent, or Firm* — Young & Thompson

(57) ABSTRACT

A zoom lens consists of positive first lens group, which is fixed during changing magnification, negative second lens group, which is moved during changing magnification, negative third lens group for correcting a fluctuation of an image plane caused by changing magnification, and positive fourth lens group, which is fixed during changing magnification, which are in this order from an object side. The first lens group consists of negative lens and positive lens group consisting of three or less positive lenses in this order from the object side. Each of the negative lens and at least one of the positive lens or lenses in the first lens group has at least an aspherical surface. A predetermined formula is satisfied.

14 Claims, 15 Drawing Sheets

ZOOM LENS AND IMAGING APPARATUS

CROSS REFERENCE TO RELATED APPLICATIONS

This application is a continuation of PCT/JP2011/007007 filed on Dec. 15, 2011, which claims foreign priority to Japanese Application No. 2010-280516 filed on Dec. 16, 2010. The entire contents of each of the above applications are hereby incorporated by reference.

BACKGROUND OF THE INVENTION

1. Field of the Invention

The present invention relates to a zoom lens and an imaging apparatus, and particularly to a zoom lens appropriate to be mounted on a TV camera, a video camera or the like, and an imaging apparatus including the zoom lens.

2. Description of the Related Art

Conventionally, four-group-type zoom lenses are known as zoom lenses mounted on TV cameras, video cameras, or the like. As four-group-type zoom lenses, for example, there is a zoom lens in which a second lens group, which is a second lens group from the object side, is a lens group for changing magnification, and a third lens group, which is a third lens group from the object side, corrects a movement of an image plane caused by changing magnification. Such a zoom lens is proposed, for example, in Japanese Unexamined Patent Publication No. 2005-084409 (Patent Document 1) and U.S. Pat. No. 5,995,297 (Patent Document 2), as follows.

Patent Document 1 discloses a zoom lens in which a first lens group, which is a most-object-side lens group, consists of six lenses of a negative lens and five positive lenses, which are arranged in this order from the object side. Patent Document 2 discloses a zoom lens in which a first lens group, which is a most-object-side lens group, consists of four lenses or five lenses of a negative lens and three or four positive lenses, which are arranged in this order from the object side.

SUMMARY OF THE INVENTION

Meanwhile, recent imaging apparatuses, such as a TV camera and a video camera, are generally structured in such a manner to image an image formed by a zoom lens by an imaging device, such as a CCD (Charge Coupled Device) and a CMOS (Complementary Metal Oxide Semiconductor). In recent years, as the size of an imaging device, such as a CCD and a CMOS, became small, reduction in size and weight of an imaging apparatus and a lens system mounted on the imaging apparatus is also requested. Further, in recent years, as imaging devices having large pixel numbers were developed to achieve a high image quality, a lens system having higher resolution performance is also requested. Further, development of a zoom lens having a high variable magnification ratio, and which can perform a wide range of photography, while reduction in cost is achieved is desired.

However, when high performance and a high variable magnification ratio are tried to be achieved in a four-group-type zoom lens, the number of lenses constituting a first lens group, which is a most-object-side lens group, increases, and the size becomes large. Therefore, the weight of the zoom lens tends to become heavy. The number of the lenses constituting the first lens group may be reduced, or the thickness of each lens constituting the first lens group may be reduced to reduce the size, the weight and the cost of the zoom lens. However, in such a case, a spherical aberration and image plane characteristics tend to deteriorate. Therefore, development of a zoom lens that suppresses generation of various aberrations and that achieves a high resolution and a high variable magnification ratio is needed while reduction in size, weight and cost is achieved.

Patent Document 1 discloses a zoom lens having a variable magnification ratio of about 18 times. The zoom lens has high performance, but the number of lenses constituting the first lens group is six. Therefore, the zoom lens is disadvantageous to reduction in size, weight and cost. Patent Document 2 discloses a zoom lens having a variable magnification ratio of about 20 to 35 times, and the number of lenses constituting the first lens group is four or less. However, in these zoom lenses, a distance between a negative lens in the first lens group and a positive lens immediately on the image side of the negative lens is narrow, and the height of rays entering plural positive lenses in the first lens group on a wide angle side tends become high. Therefore, the diameters of the positive lenses tend to become large, and there is a risk that the weight of the lens system becomes heavy.

In view of the foregoing circumstances, it is an object of the present invention to provide a zoom lens in which reduction in size, weight and cost is achieved while high performance and a high variable magnification ratio are secured, and an imaging apparatus including the zoom lens.

A first zoom lens of the present invention is a zoom lens consisting of:

a first lens group having positive refractive power, and which is fixed during changing magnification;

a second lens group having negative refractive power, and which is moved during changing magnification;

a third lens group having negative refractive power for correcting a fluctuation of an image plane caused by changing magnification; and a fourth lens group having positive refractive power, and which is fixed during changing magnification, which are in this order from an object side, wherein the first lens group consists of a negative lens and a positive lens group consisting of three or less positive lenses in this order from the object side, and wherein each of the negative lens in the first lens group and at least one of the positive lens or lenses in the first lens group has at least an aspherical surface, and wherein the following formula (1) is satisfied:

$$0.14 < d12/fG1 < 0.44 \quad (1), \text{where}$$

d12 is a distance on an optical axis between the negative lens in the first lens group and a positive lens immediately on the image side of the negative lens, and fG1 is a focal length of the first lens group.

In the first zoom lens of the present invention, four lens groups having positive refractive power, negative refractive power, negative refractive power, and positive refractive power are arranged in this order from the object side. The four-group-type zoom lens moves the second lens group during changing magnification, and a fluctuation of an image plane caused by changing magnification is corrected by the third lens group. In the zoom lens, the first lens group that has a major part of the weight of the zoom lens is structured in an appropriate manner. Especially, the number of lenses constituting the first lens group is four or less, and the powers of the lenses are appropriately arranged in the first lens group. Further, an aspherical surface is applied to both of a negative lens and a positive lens, and a distance between the negative lens and a positive lens immediately on the image side of the negative lens is appropriately set to satisfy the formula (1). When the zoom lens is structured in such a manner, it is easy to reduce size, weight and cost while high performance and a high variable magnification ratio are secured.

A second zoom lens of the present invention is a zoom lens consisting of:

a first lens group having positive refractive power, and which is fixed during changing magnification;

a second lens group having negative refractive power, and which is moved during changing magnification;

a third lens group having negative refractive power for correcting a fluctuation of an image plane caused by changing magnification; and a fourth lens group having positive refractive power, and which is fixed during changing magnification, which are in this order from an object side, wherein the first lens group consists of a negative lens and a positive lens group consisting of three positive lenses in this order from the object side, and wherein each of the negative lens in the first lens group and at least one of the positive lenses in the first lens group has at least an aspherical surface, and wherein focusing is performed by moving only two image-side positive lenses in the first lens group, and wherein the following formula (5) is satisfied:

$$0.08 < d23/fG1 < 0.15 \qquad (5),$$

where d23 is a distance on an optical axis between a first positive lens from the object side in the positive lens group and a second positive lens from the object side in the positive lens group during focusing on an object at infinity, and fG1 is a focal length of the first lens group.

In the second zoom lens of the present invention, four lens groups having positive refractive power, negative refractive power, negative refractive power, and positive refractive power are arranged in this order from the object side. The four-group-type zoom lens moves the second lens group during changing magnification, and a fluctuation of an image plane caused by changing magnification is corrected by the third lens group. In the zoom lens, the first lens group that has a major part of the weight of the zoom lens is structured in an appropriate manner. Especially, the number of lenses constituting the first lens group is four, and the powers of the lenses are appropriately arranged in the first lens group. Further, an aspherical surface is applied to both of a negative lens and a positive lens, and an inner focus method is adopted. Further, a distance between a sub-lens-group that moves during focusing and a sub-lens-group that is fixed during focusing is appropriately set to satisfy the formula (5). When the zoom lens is structured in such a manner, it is easy to reduce size, weight and cost while high performance and a high variable magnification ratio are secured.

A third zoom lens of the present invention is a zoom lens consisting of:

a first lens group having positive refractive power, and which is fixed during changing magnification;

a second lens group having negative refractive power, and which is moved during changing magnification;

a third lens group having negative refractive power for correcting a fluctuation of an image plane caused by changing magnification; and a fourth lens group having positive refractive power, and which is fixed during changing magnification, which are in this order from an object side, wherein the first lens group consists of a negative lens and a positive lens group consisting of two positive lenses in this order from the object side, and wherein each of all the lenses constituting the first lens group has at least an aspherical surface.

In the third zoom lens of the present invention, four lens groups having positive refractive power, negative refractive power, negative refractive power, and positive refractive power are arranged in this order from the object side. The four-group-type zoom lens moves the second lens group during changing magnification, and a fluctuation of an image plane caused by changing magnification is corrected by the third lens group. In the zoom lens, the first lens group that has a major part of the weight of the zoom lens is structured in an appropriate manner. Especially, the number of lenses constituting the first lens group is three, and the powers of the lenses are appropriately arranged in the first lens group. Further, an aspherical surface is applied to each of all the lenses constituting the first lens group. When the zoom lens is structured in such a manner, it is easy to reduce size, weight and cost while high performance and a high variable magnification ratio are secured.

In the first, second and third zoom lenses of the present invention, it is desirable that the following formulas (2) and (3) are satisfied:

$$20.0 < vn < 31.5 \qquad (2); \text{ and}$$

$$78.0 < vp \qquad (3),$$

where vn is an Abbe number of the negative lens in the first lens group with respect to d-line, and vp is an average of Abbe numbers of the positive lens group with respect to d-line.

In the first, second and third zoom lenses of the present invention, it is desirable that the following formula (4) is satisfied:

$$-3.30 < fn/fp < -1.70 \qquad (4),$$

where fn is a focal length of the negative lens in the first lens group, and fp is a focal length of the positive lens group.

In the first zoom lens of the present invention, the first lens group may consist of a front group having negative refractive and a rear group having positive refractive power in this order from the object side, and focusing may be performed by moving only the rear group.

In the first and third zoom lenses of the present invention, the first lens group may consist of a plurality of sub-lens-groups, and at least two of the plurality of sub-lens-groups may move independently of each other during focusing.

In the first, second and third zoom lenses of the present invention, the sign of the refractive power of a lens represents refractive power in a paraxial region when each lens is an aspherical lens.

The expression "a positive lens immediately on the image side of the negative lens" means a positive lens arranged on the image side of the negative lens without any optical member having refractive power therebetween.

An imaging apparatus of the present invention includes an aforementioned zoom lens of the present invention, and an imaging device that images an optical image formed by the zoom lens.

According to the zoom lens of the present invention, four lens groups having positive refractive power, negative refractive power, negative refractive power, and positive refractive power are arranged in this order from the object side. The four-group-type zoom lens moves the second lens group during changing magnification, and a fluctuation of an image plane caused by changing magnification is corrected by the third lens group. In the zoom lens, the first lens group that has a major part of the weight of the zoom lens is structured in an appropriate manner. Therefore, various aberrations are corrected in an excellent manner for the entire range of variable magnification. It is possible to reduce size, weight and cost while high performance and a high variable magnification ratio are secured.

The imaging apparatus of the present invention includes a zoom lens of the present invention. Therefore, the imaging apparatus can obtain an excellent image at a high variable magnification ratio. It is possible to structure the imaging apparatus of the present invention in small size, at light weight and at low cost.

DESCRIPTION OF THE PREFERRED EMBODIMENTS

Figure 1:
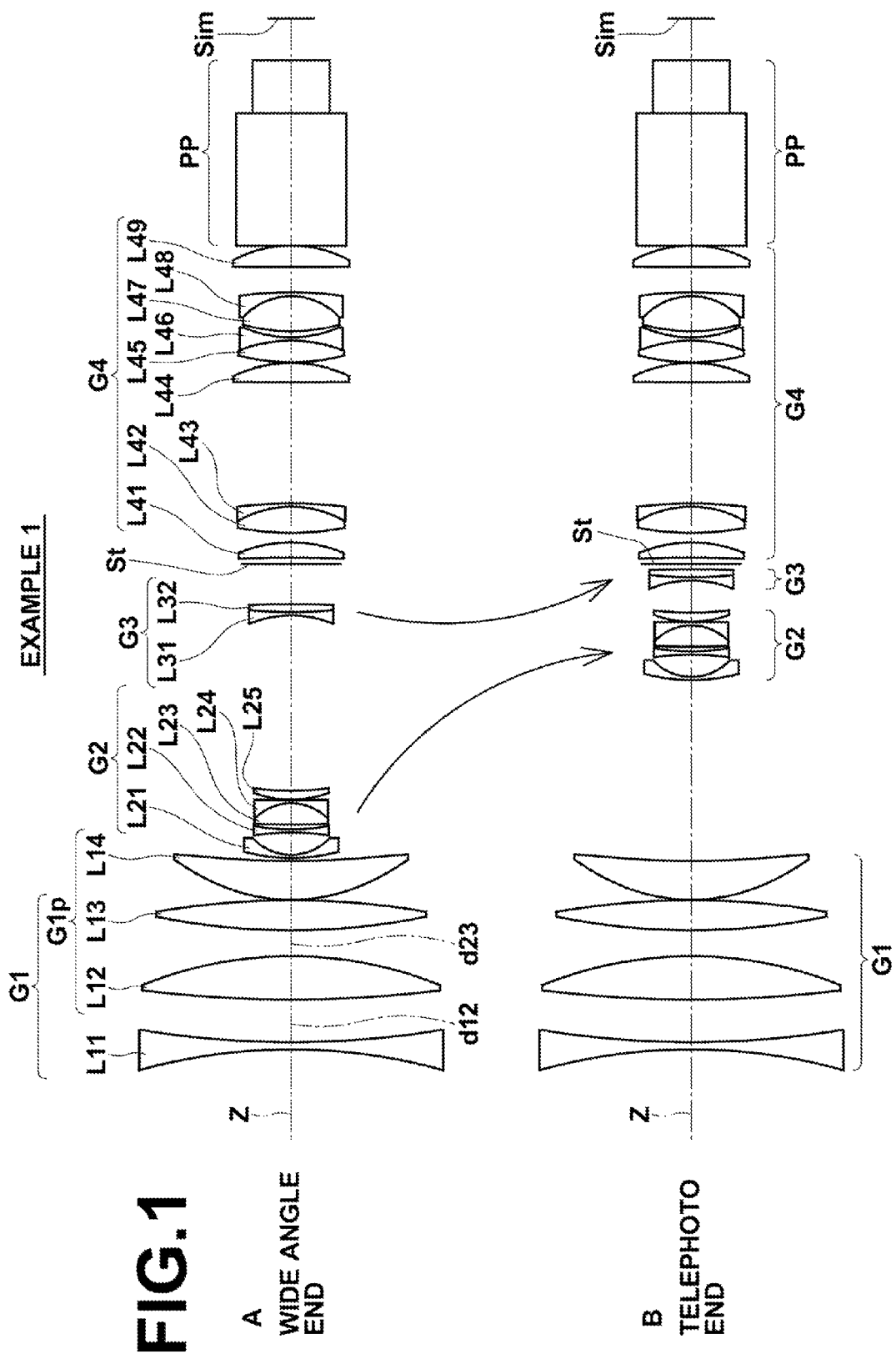
FIG. 1 is a cross section illustrating the lens structure of a zoom lens in Example 1 of the present invention, and Section A is a state at a wide angle end, and Section B is a state at a telephoto end.
Figure 2:
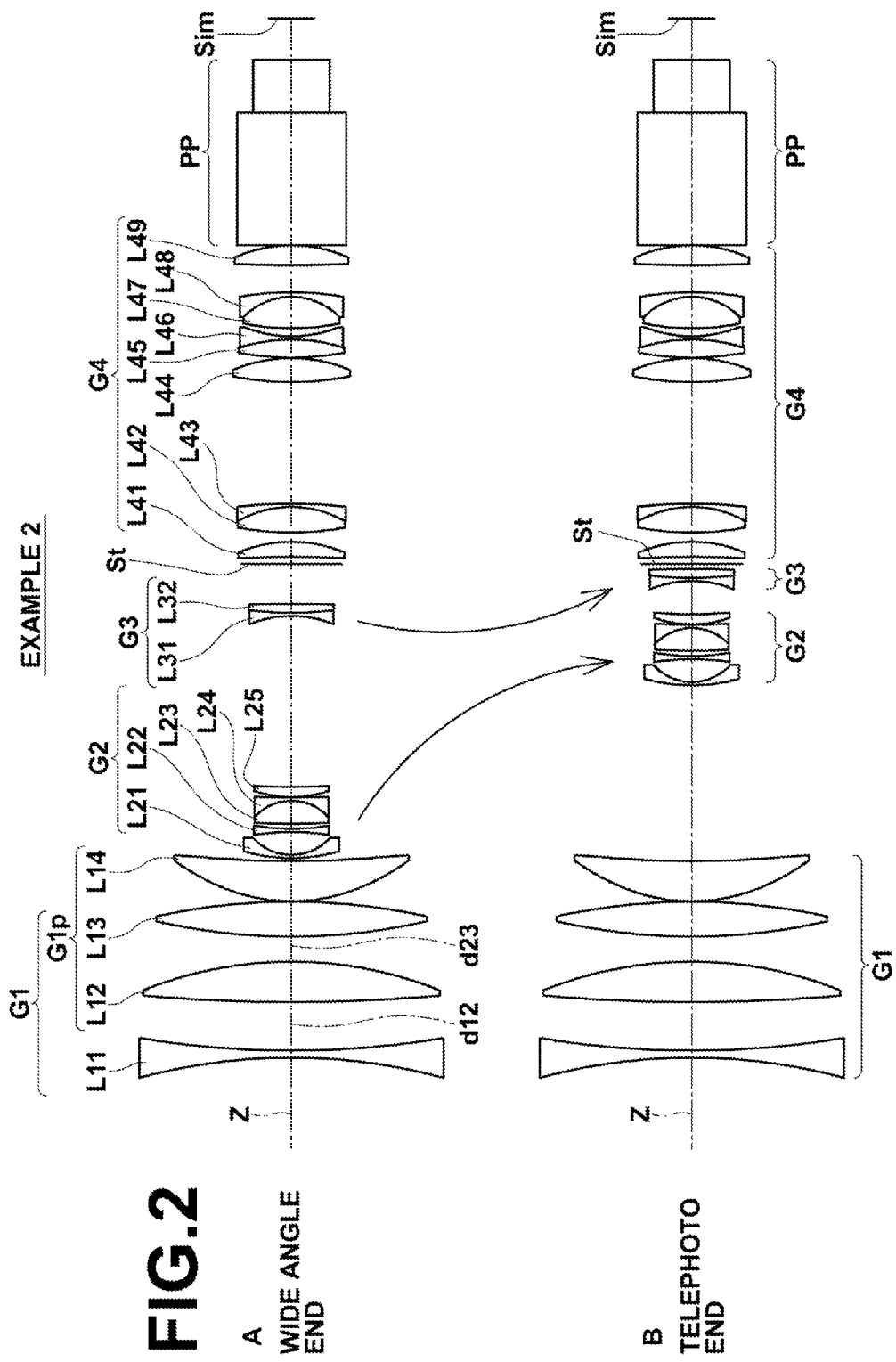
FIG. 2 is a cross section illustrating the lens structure of a zoom lens in Example 2 of the present invention, and Section A is a state at a wide angle end, and Section B is a state at a telephoto end.
Figure 3:
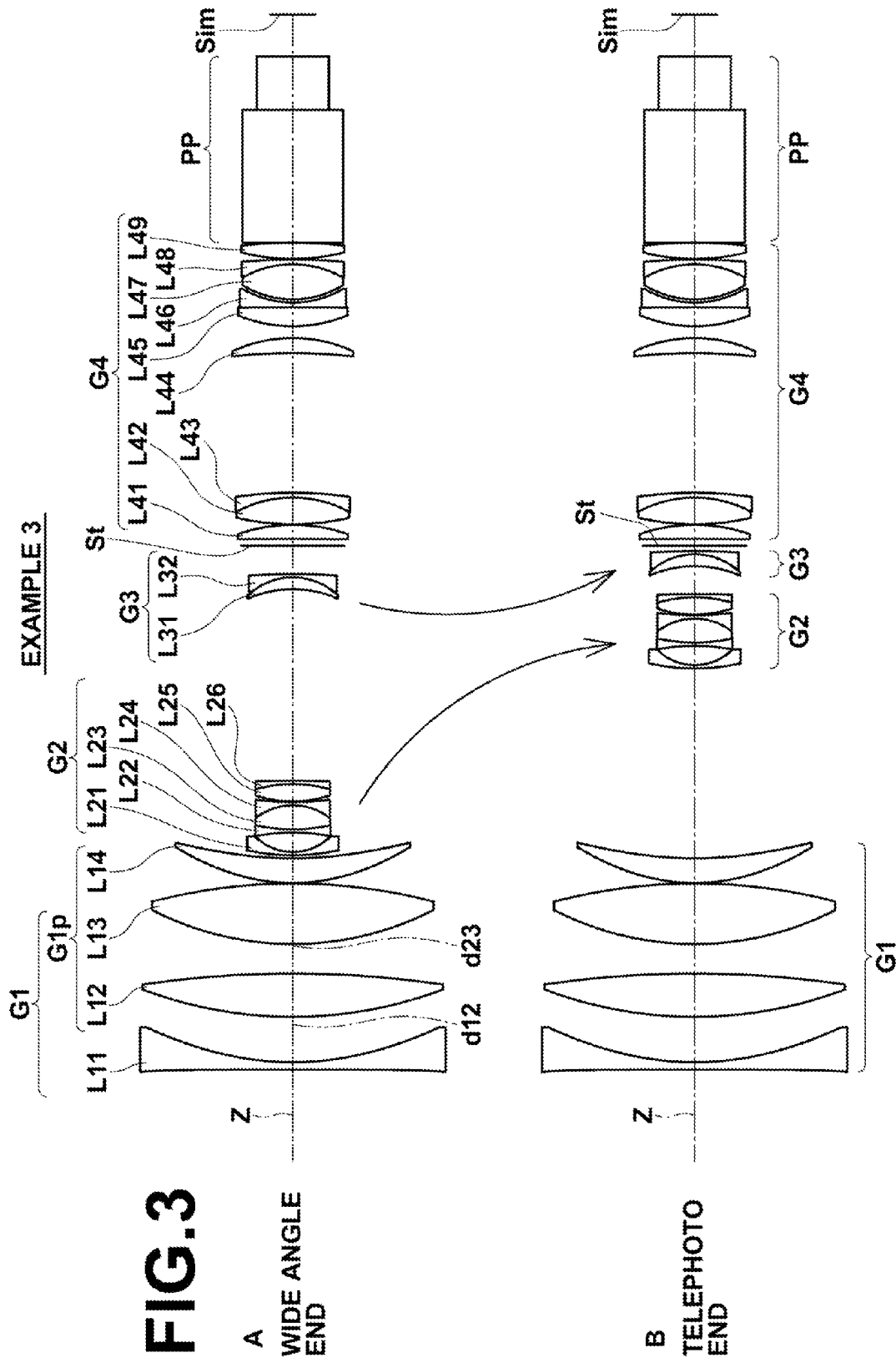
FIG. 3 is a cross section illustrating the lens structure of a zoom lens in Example 3 of the present invention, and Section A is a state at a wide angle end, and Section B is a state at a telephoto end.
Figure 5:
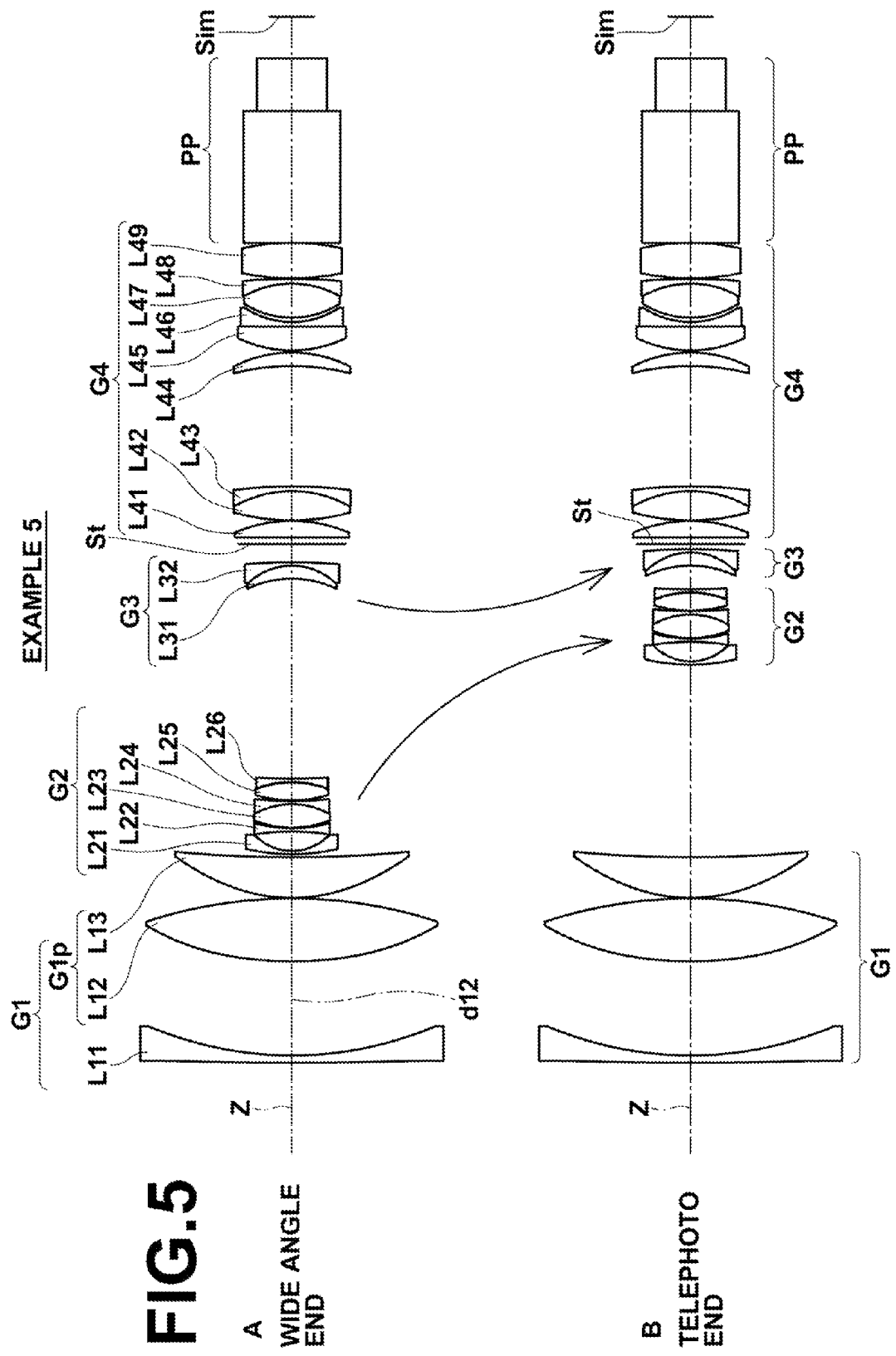
FIG. 5 is a cross section illustrating the lens structure of a zoom lens in Example 5 of the present invention, and Section A is a state at a wide angle end, and Section B is a state at a telephoto end.
Figure 6:
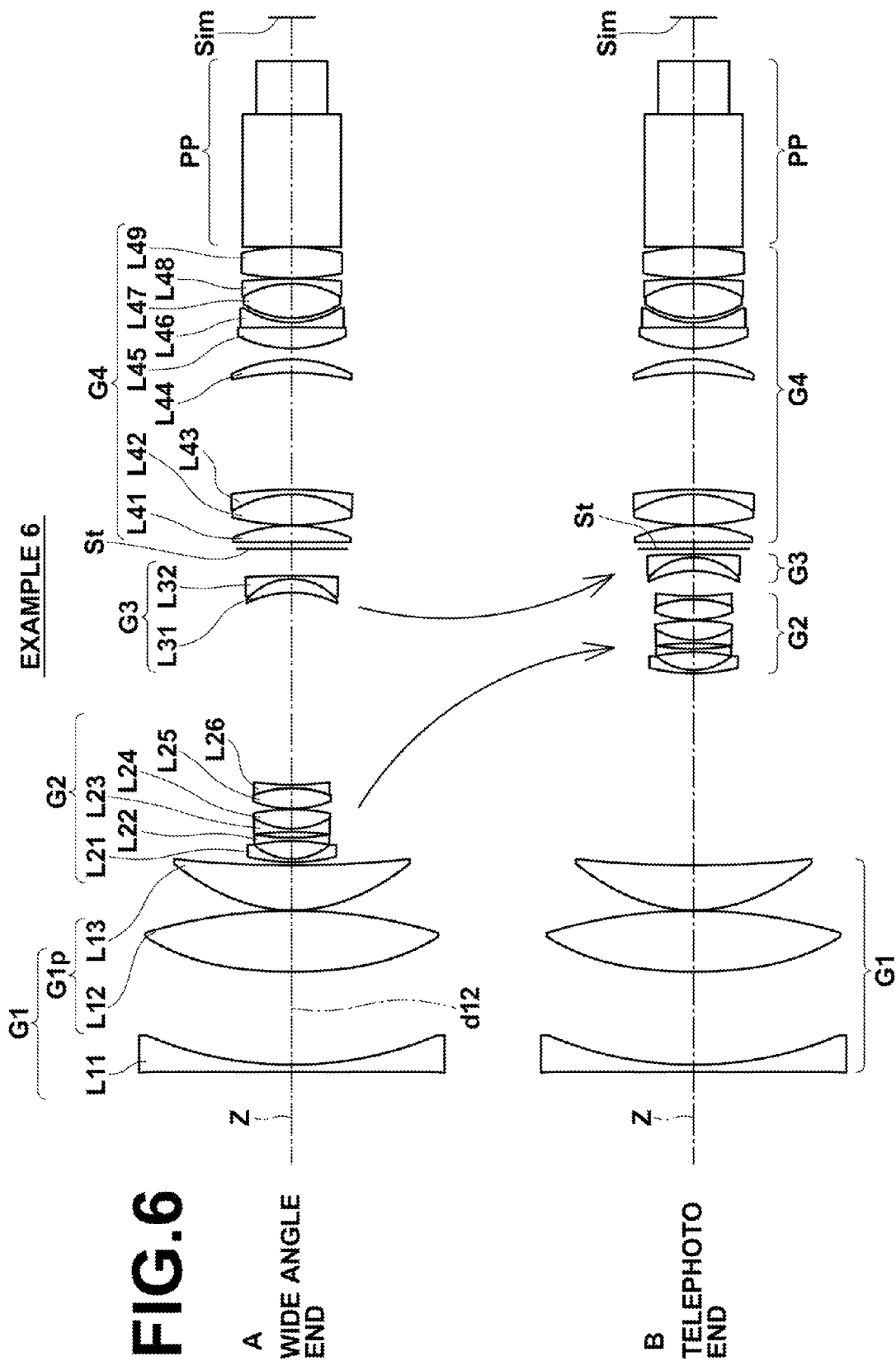
FIG. 6 is a cross section illustrating the lens structure of a zoom lens in Example 6 of the present invention, and Section A is a state at a wide angle end, and Section B is a state at a telephoto end.
Figure 7:
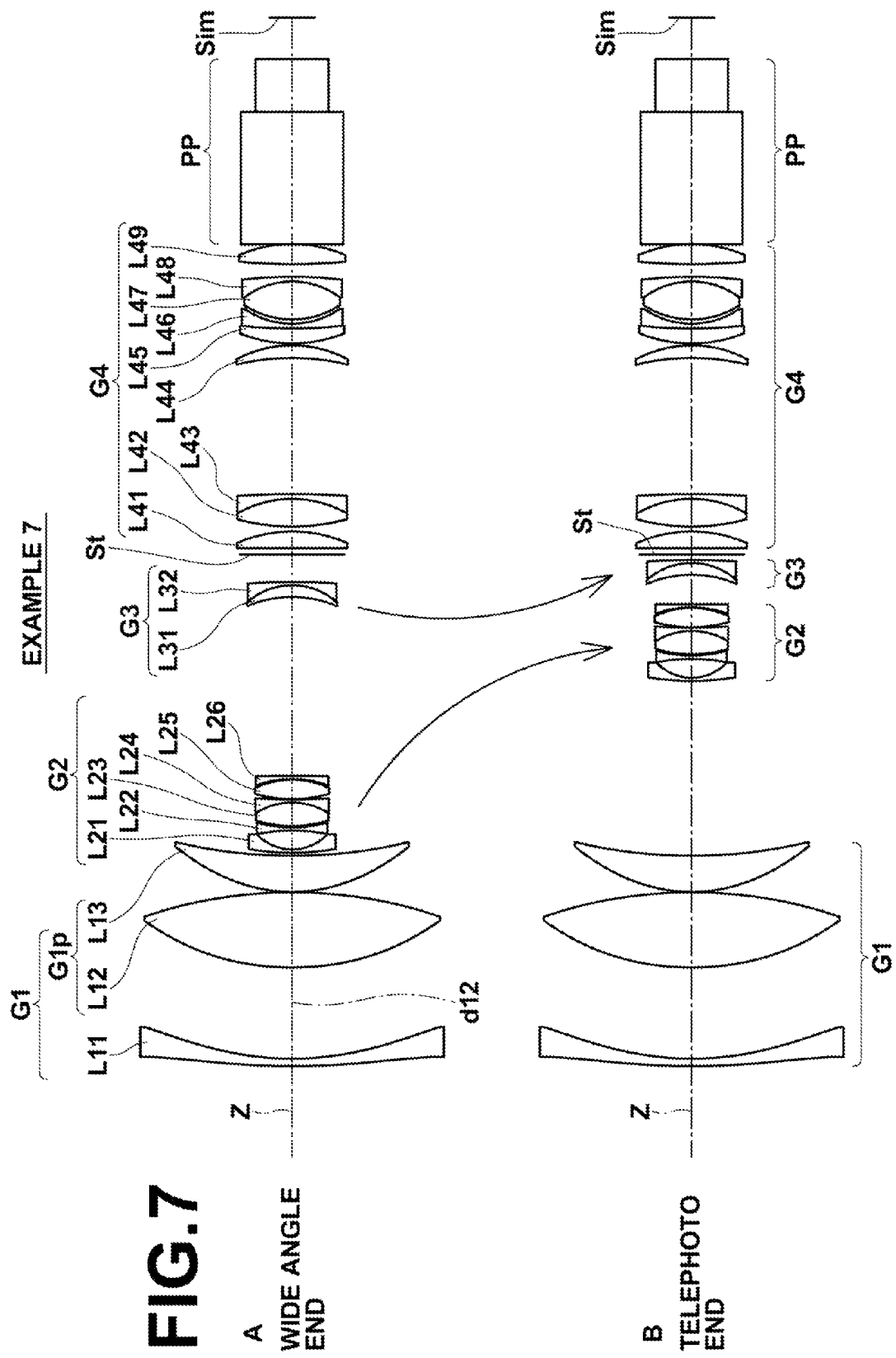
FIG. 7 is a cross section illustrating the lens structure of a zoom lens in Example 7 of the present invention, and Section A is a state at a wide angle end, and Section B is a state at a telephoto end.

Hereinafter, embodiments of the present invention will be described with reference to drawings. Cross sections of zoom lenses according to the embodiments of the present invention are illustrated in FIG. 1, Sections A and B, FIG. 2, Sections A and B, FIG. 3, Sections A and B, FIG. 4, Sections A and B, FIG. 5, Sections A and B, FIG. 6, Sections A and B, FIG. 7, Sections A and B. A structure example illustrated in FIG. 1, Sections A and B corresponds to a zoom lens of Example 1, which will be described later, as indicated at the top of FIG. 1, Section A. Similarly, the structure examples illustrated in FIG. 2, Section A through FIG. 7, Section B correspond to zoom lenses of Examples 2 through 7, which will be described later. The basic structure of these structure examples is the same, and the method for illustrating these diagrams is basically similar to each other. Therefore, here, the zoom lenses according to the embodiments of the present invention will be described mainly with reference to the structure example illustrated in FIG. 1, Section A and FIG. 1, Section B.

This zoom lens has small size and light weight while it has a variable magnification ratio of, for example, about 18 times. This zoom lens consists of four lens groups of first lens group G1 through fourth lens group G4. FIG. 1, Sections A and B illustrate the arrangement of lenses at a wide angle end and a telephoto end, respectively, in a state of focusing on an object at infinity. The left side of the drawing is an object side, and the right side of the drawing is an image side. Further, arrows between FIG. 1, Section A and FIG. 1, Section B schematically illustrate paths of movement of lens groups that move when magnification is changed.

When a zoom lens is mounted on an imaging apparatus, it is desirable that the imaging apparatus is structured in such a manner to include a cover glass for protecting an imaging plane of an imaging device, a prism, such as a color separation prism appropriate for the specification of the imaging apparatus, and various filters, such as a low-pass filter and an infrared ray cut filter. FIG. 1, Section A and FIG. 1, Section B illustrate an example in which parallel-flat-plate-shaped optical member PP assuming these elements is arranged between the fourth lens group G4 and image plane Sim.

This zoom lens is structured by arranging, along optical axis Z, first lens group G1 having positive refractive power, and which is fixed during changing magnification, second lens group G2 having negative refractive power, and which is moved during changing magnification, third lens group G3 having negative refractive power, and which is moved to correct a fluctuation of an image plane caused by changing magnification, and fourth lens group G4 having positive refractive power, and which is fixed during changing magnification, which are in this order from an object side. Aperture stop St may be arranged, for example, in the vicinity of the object side of the fourth lens group G4 between the third lens group G3 and the fourth lens group G4. In FIG. 1, Section A and FIG. 1, Section B, the aperture stop St does not represent the size nor the shape of the aperture stop St, but a position on the optical axis.

The first lens group G1 consists of one negative lens L11 and positive lens group G1$p$ consisting of three or less positive lenses, which are in this order from the object side. Since the outer diameters of the lenses in the first lens group G1, which is arranged on the most object side, are large, if the number of lenses constituting the first lens group G1 increases and exceeds the number of the one negative lens L11 and the three or less positive lenses, the cost and the weight increase. Therefore, it becomes difficult to reduce cost and weight to such an extent to satisfy a demand of recent years.

It is necessary to reduce the number of lenses as much as possible to reduce weight and cost. However, it is difficult to achieve desirable performance only by simply reducing the number of lenses. Therefore, the zoom lens of the present invention is structured in such a manner that each of negative lens L11 in the first lens group G1 and at least one of the positive lenses in the positive lens group G1p has at least an aspherical surface in order to achieve desirable performance while structuring the first lens group G1 with a small number of lenses. If all of the lenses in the first lens group G1 are spherical lenses without using any aspherical surface, the number of lenses increases to correct various aberrations, and the total length becomes long. Therefore, compact structure is not achievable, and it becomes impossible to reduce weight.

When the most-object-side negative lens L11 is an aspherical lens, it is possible to correct various aberrations, such as off-axial aberrations, in an excellent manner. Further, it is easy to achieve high resolution. Further, it is desirable that an aspherical surface is applied to a most-image-side lens in the positive lens group G1p. In such a case, that is advantageous to correction of a spherical aberration and a distortion aberration on a telephoto side.

For example, the first lens group G1 may consist of four lenses of negative lens L11, and positive lenses L12, L13, and L14, which are arranged in this order from the object side, as illustrated in the example of FIG. 1, Section A and FIG. 1, Section B, and two lenses of the negative lens L11 and the positive lens L14 may be aspherical lenses. Since production of a large-diameter aspherical lens tends to be difficult and at high cost, the feature that two or less aspherical lens is included in the first lens group G1 is cost-advantageous.

Figure 4:
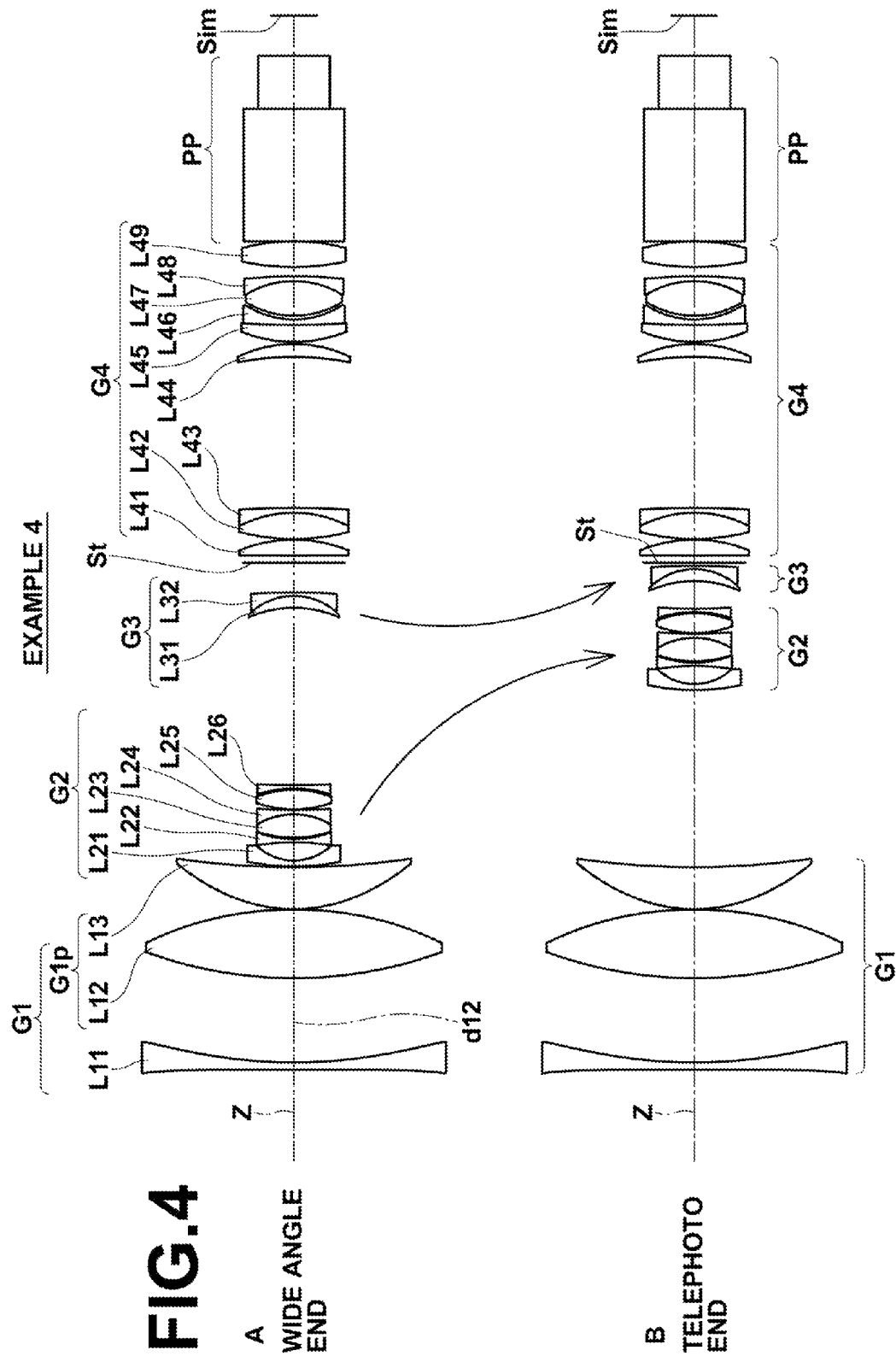
FIG. 4 is a cross section illustrating the lens structure of a zoom lens in Example 4 of the present invention, and Section A is a state at a wide angle end, and Section B is a state at a telephoto end.

Alternatively, for example, when the first lens group G1 consists of three lenses of negative lens L11, and positive lenses L12 and L13, which are arranged in this order from the object side, as illustrated in the example of FIG. 4, Section A and FIG. 4, Section B, each of all the three lenses may have at least an aspherical lenses. When all of the lenses constituting the first lens group G1 are aspherical lenses, it is possible to reduce the number of lenses constituting the first lens group G1 as much as possible to make the first lens group G1 consist of three lenses. Therefore, it is possible to reduce size, weight and cost.

The negative lens L11 may be a double concave lens, or a negative meniscus lens. When the negative lens L11 is a negative meniscus lens, it is desirable that a convex surface is directed to the object side. If the negative lens L11 is a negative meniscus lens having a convex surface directed to the image side, curvature of field at a wide angle end has a large absolute value on the minus side, and a distortion aberration increases. Further, a spherical aberration at a telephoto end has a large absolute value on the minus side.

In the positive lens group G1p, it is desirable that the most-image-side lens in the positive lens group G1p is a positive meniscus lens and the other lens or lenses are double convex lenses. When the most-image-side positive lens in the positive lens group G1p has a meniscus shape, it is possible to gently guide peripheral rays at a telephoto end and off-axial rays at a wide angle end to second lens group G2. Therefore, it is possible to increase the effect of correcting a spherical aberration at a telephoto end and the effect of correcting curvature of field and a distortion aberration at a wide angle end. It is desirable to use a material having a large Abbe number for a lens or lenses in the positive lens group G1p other than the most-image-side lens in the positive lens group G1p to correct chromatic aberrations. In such a case, the effect of correcting chromatic aberrations is higher as the thickness of the lens or lenses is thicker. Therefore, it is desirable that a double convex shape is adopted.

Further, it is desirable that this zoom lens has the following structures appropriately and optionally. As a desirable mode, the zoom lens may include one of the structures as described below, or an arbitrary combination of plural structures.

It is desirable that the first lens group G1 satisfies the following formula (1):

$$0.14 < d12/fG1 < 0.44 \quad (1),$$ where $12$ is a distance on an optical axis between the negative lens L11 in the first lens group G1 and the positive lens L12 immediately on the image side of the negative lens, and fG1 is a focal length of the first lens group G1.

The formula (1) defines an appropriate range of the ratio of a distance between the negative lens L11 and the positive lens L12 immediately on the image side of the negative lens L11 and the focal length of the first lens group G1. It is important to arrange lenses in the first lens group G1 by setting an appropriate distance between lenses to correct aberrations in an excellent manner by a small number of lenses and to reduce the size of the zoom lens. If the value is lower than the lower limit of the formula (1), and a distance in air between the negative lens L11 and the positive lens L12 becomes narrow, it becomes difficult to correct astigmatism and distortion on a wide angle side and a spherical aberration on a telephoto side in an excellent manner. Further, off-axial rays that have passed the negative lens L11 enter the positive lens L12 at a high position on a wide angle side. Therefore, the diameter of the positive lens included in the positive lens group G1p increases, and reduction in weight becomes difficult. If the value exceeds the upper limit of the formula (1) and a distance in air between the negative lens L11 and the positive lens L12 becomes wide, the power of the negative lens L11 and the positive lens group G1p becomes weak, and the total length increases. Hence, it becomes difficult to obtain a compact zoom lens.

It is desirable that the following formula (2) is satisfied:

$$20.0 < \nu n < 31.5 \quad (2),$$ where $\nu n$ is an Abbe number of the negative lens L11 in the first lens group G1 with respect to d-line.

The formula (2) defines an appropriate range of the Abbe number of the negative lens L11 in the first lens group G1. A residual secondary spectrum needs to be small, and even if magnification is changed, a fluctuation amount of a chromatic aberration also needs to be small in order to realize a high performance zoom lens having a high variable magnification ratio. If the value is lower than the lower limit of formula (2), a residual secondary spectrum of a longitudinal chromatic aberration increases, and a color fringe is produced in an obtained image. Therefore, it becomes difficult to achieve sufficient performance. Further, when the value is lower than the lower limit of the formula (2), many optical materials that are currently usable are colored. If such a colored material is used, a problem in color balance arises. When this zoom lens is used in a TV camera for broadcasting, the color balance is important. If the value exceeds the upper limit of the formula (2), a difference between the Abbe number of the negative lens L11 and the Abbe number of the positive lens or lenses in the first lens group G1 becomes small. Therefore, primary chromatic aberration correction becomes difficult.

Further, it is desirable that the following formula (3) is satisfied:

$$78.0 < \nu p \quad (3),$$ where $\nu p$ is an average of Abbe numbers of positive lens group G1p in the first lens group G1 with respect to d-line.

The formula (3) defines an appropriate range of the Abbe number of a positive lens or lenses in the first lens group G1. A residual secondary spectrum needs to be small, and even if magnification is changed, a fluctuation amount of a chromatic aberration also needs to be small in order to realize a high performance zoom lens having a high variable magnification ratio. If the value is lower than the lower limit of formula (3), a residual secondary spectrum of a longitudinal chromatic aberration increases, and a color fringe is produced in an obtained image. Therefore, it becomes difficult to achieve sufficient performance.

It is desirable that the following formula (4) is satisfied:

$$-3.30 < fn/fp < -1.70 \qquad (4),$$ where fn is a focal length of the negative lens L11 in the first lens group G1, and fp is a focal length of the positive lens group G1p in the first lens group G1.

The formula (4) defines an appropriate range of the ratio of the power of the negative lens L11, which constitutes the first lens group G1, and the power of the positive lens group G1p, which constitutes the first lens group G1. If the value is lower than the lower limit of the formula (4), and the power of the negative lens L11 becomes weak, astigmatism on a wide angle side becomes large. Further, a spherical aberration on a telephoto side is undercorrected, and correction becomes difficult. Therefore, that is not desirable. If the value exceeds the upper limit of the formula (4), and the power of the positive lens group G1p becomes weak, a chromatic aberration on a telephoto side, especially, a longitudinal chromatic aberration increases. Further, it becomes difficult to correct a spherical aberration in an excellent manner, and it is impossible to achieve high performance.

At least apart of the first lens group G1 may have a focusing function for focusing by moving in an optical axis direction when an object distance has fluctuated. For example, a whole-group extension method in which focusing is performed by moving the whole first lens group G1 may be adopted.

Alternatively, the first lens group G1 may be regarded as a lens group consisting of a front group having negative refractive power and a rear group having positive refractive power, and an inner focus method may be adopted. In the inner focus method, when an object distance has fluctuated, focusing is performed by moving only the rear group. In the example illustrated in FIG. 1, Section A and FIG. 1, Section B, for example, the front group may be regarded as a group of negative lens L11 and positive lens L12, and the rear group may be regarded as a group of positive lens L13 and positive lens L14. When the number of lenses that move during focusing is two, it is possible to reduce a load on a drive system, compared with the whole-group extension method. Further, the inner focus method has an advantage that the total length of the lens does not change during focusing.

Alternatively, the first lens group G1 may be regarded as a lens group consisting of plural sub-lens-groups, and a floating focus method may be adopted. In the floating focus method, when an object distance has fluctuated, at least two of the plural sub-lens-groups move independently of each other during focusing. When the number of lenses in the first lens group G1 is reduced, a change in performance during fluctuation of an object distance, especially, a change in performance on a telephoto side becomes large. However, it is possible to suppress the change in performance by adopting the inner focus method or the floating focus method.

When the first lens group G1 consists of four lenses of one negative lens L11 and positive lens group G1p consisting of three positive lenses, which are in this order from the object side, and only two image-side positive lenses in the first lens group G1 are moved to focus when an object distance has fluctuated, it is desirable that the following formula (5) is satisfied. Here, d23 is a distance on an optical axis between first positive lens L12 from the object side in the positive lens group G1p in the first lens group G1 and second positive lens L13 from the object side in the positive lens group G1p during focusing on an object at infinity, and fG1 is a focal length of the first lens group G1.

$$0.08 < d23/fG1 < 0.15 \qquad (5).$$

The formula (5) defines an appropriate range of the ratio of a distance between the positive lens L12 and the positive lens L13 and the focal length of the first lens group G1. If the value is lower than the lower limit of the formula (5), and the distance between the positive lens L12 and the positive lens L13 becomes narrow, a focus stroke becomes short. Therefore, it becomes difficult to correct a change in performance caused by fluctuation of an object distance. If the value exceeds the upper limit of the formula (5), and the distance between the positive lens L12 and the positive lens L13 becomes wide, it is possible to easily correct a change in performance caused by fluctuation of an object distance. However, the total length of the first lens group G1 becomes long, and it becomes difficult to obtain a compact zoom lens.

It is desirable to satisfy the following formulas (1-1) through (5-1) instead of the formulas (1) through (5), respectively, to further improve the effects obtainable when the formulas (1) through (5) are satisfied respectively.

$$0.16 < d12/fG1 < 0.42 \qquad (1\text{-}1)$$

$$22.0 < vn < 29.0 \qquad (2\text{-}1)$$

$$80.0 < vp \qquad (3\text{-}1)$$

$$-3.10 < fn/fp < -1.90 \qquad (4\text{-}1)$$

$$0.105 < d23/fG1 < 0.130 \qquad (5\text{-}1)$$

For example, the second lens group G2 may consist of five lenses of lens L21, lens L22, lens L23, lens L24, and lens L25, which are in this order from the object side. Alternatively, the second lens group G2 may consist of six lenses by further arranging lens L26 on the image side of the lens L25.

For example, the third lens group G3 may consist of two lenses of lens L31 and L32, which are in this order from the object side. The fourth lens group G4 may consist of, for example, nine lenses of lens L41, lens L42, lens L43, lens L44, lens L45, lens L46, lens L47, lens L48, and lens L49, which are in this order from the object side.

Here, when the zoom lens is used in tough conditions, for example, such as outdoors, it is desirable that the lens arranged on the most object side uses a material resistant to a deterioration of a surface by wind and rain and a change in temperature by direct sun light, and resistant to chemicals, such as oils and fats and detergents. In other words, it is desirable to use a material that is highly water-resistant, weather-resistant, acid-resistant, chemical-resistant, and the like. Further, it is desirable to use a material that is hard and not easily breakable.

When it is important to satisfy these requirements, it is desirable that the material of the lens arranged on the most object side is glass. Alternatively, transparent ceramic may be used.

Further, when the zoom lens is used in tough conditions, it is desirable that a multi-layer coating for protection is applied. Further, an anti-reflection coating for reducing ghost light or the like during usage may be applied besides the coating for protection.

In the example illustrated in FIG. 1, Section A and FIG. 1, Section B, optical member PP is arranged further on the image side of the most-image-side lens. Alternatively, various filters may be arranged between the lenses. Alternatively, a coating having a similar function to various filters may be applied to a lens surface of one of the lenses.

Next, numerical value examples of the zoom lenses of the present invention will be described. As described already, FIG. 1, Section A, FIG. 1, Section B, FIG. 2, Section A, FIG. 2, Section B, FIG. 3, Section A, FIG. 3, Section B, FIG. 4, Section A, FIG. 4, Section B, FIG. 5, Section A, FIG. 5, Section B, FIG. 6, Section A, FIG. 6, Section B, FIG. 7, Section A, and FIG. 7, Section B illustrate lens cross sections of the zoom lenses of Example 1 through Example 7.

Table 1 shows basic lens data on a zoom lens of Example 1, and Table 2 shows data on zoom, and Table 3 shows aspherical surface data. Similarly, Table 4 through Table 21 show basic lens data, data on zoom and aspherical surface data about zoom lenses of Examples 2 through 7. Next, the meanings of signs in the tables will be described, using the tables of Example 1 as an example. The meaning of signs in the tables of Examples 2 through 7 are basically similar.

In the basic lens data of Table 1, the column Si shows the surface numbers of i-th (i=1, 2, 3, . . . ) surfaces. The surface number of the object-side surface of the most-object-side element is one, and the surface numbers sequentially increase toward the image side. The column Ri shows the curvature radius of the i-th surface. The column Di shows a distance, on optical axis Z, between the i-th surface and the (i+1)th surface. The column Ndj shows the refractive index of a j-th (j=1, 2, 3, lens with respect to d-line (wavelength is 587.6 nm) when the most-object-side lens is the first lens, and the value of j sequentially increases toward the image side. Further, the column vdj shows the Abbe number of the j-th lens with respect to d-line.

The sign of a curvature radius is positive when the shape of a surface is convex toward the object side, and negative when the shape of a surface is convex toward the image side. Further, the basic lens data include aperture stop St and optical member PP. The sign ∞ (APERTURE STOP) is written in the column of the curvature radius for a surface of the aperture stop.

In the basic lens data of Table 1, D8, D17, and D20 are written in the rows of surface distances that change when magnification is changed. D8 is a distance between the first lens group G1 and the second lens group G2, and D17 is a distance between the second lens group G2 and the third lens group G3, and D20 is a distance between the third lens group G3 and aperture stop St. However, in Example 3, D19 and D22 are used instead of D17 and D20 of Example 1, respectively. In Examples 4 through 7, D6 is used instead of D8 of Example 1.

The data on zoom in Table 2 show focal length f of an entire system, F-number (Fno.), full angle of view 2ω, and values of D8, D17 and D20 at a wide angle end, at middle, and at a telephoto end.

In the lens data of Table 1, mark * is attached to the surface number of an aspherical surface. Table 1 shows, as the curvature radius of the aspherical surface, the numerical value of a paraxial curvature radius. In Table 3, S2 or the like represents the surface number of an aspherical surface shown in Table 1. Table 3 shows aspheric coefficients about the aspherical surfaces. In the numerical values of the aspheric coefficients in Table 3, "E–n" (n: integer) means "×10$^{-n}$", and "E+n" means "×10$^{n}$". The aspheric coefficients are coefficients KA, RAm (m=3, 4, 5, . . . ) in the following aspherical equation. With respect to RAm, RAm with the value of 0 is omitted in Table 3.

$$Zd = C \cdot h^2 / \{1 + (1 - KA \cdot C^2 \cdot h^2)^{1/2}\} + \Sigma RAm \cdot h^m, \text{ where}$$

Zd: depth of aspherical surface (the length of a perpendicular from a point on the aspherical surface at height h to a flat plane that contacts with the vertex of the aspherical surface and is perpendicular to the optical axis), h: height (the length from the optical axis to the lens surface), C: paraxial curvature, and KA, RAm: aspheric coefficients (m=3, 4, 5, . . . ).

Here, mm is used as the unit of length. However, since an optical system can be used by proportionally enlarging or reducing the optical system, other appropriate units may be used. Further, in each of the tables, numerical values are rounded to predetermined digits.

TABLE 1

| Si (SURFACE NUMBER) | Ri (CURVATURE RADIUS) | Di (SURFACE DISTANCE) | Ndj (REFRACTIVE INDEX) | vdj (ABBE NUMBER) |
|---|---|---|---|---|
| 1 | −141.9228 | 1.778 | 1.755199 | 27.5 |
| *2 | 219.9475 | 10.671 | | |
| 3 | 309.8431 | 10.815 | 1.433871 | 95.2 |
| 4 | −99.6433 | 6.423 | | |
| 5 | 168.5436 | 7.496 | 1.496999 | 81.5 |
| 6 | −199.9690 | 0.120 | | |
| *7 | 44.8246 | 9.699 | 1.595220 | 67.7 |
| *8 | 226.8464 | D8 | | |
| 9 | 45.0656 | 0.800 | 2.001003 | 29.1 |
| 10 | 13.2163 | 5.542 | | |
| 11 | −65.1412 | 0.800 | 1.882997 | 40.8 |
| 12 | 51.6740 | 1.167 | | |
| 13 | 189.0046 | 5.344 | 1.808095 | 22.8 |
| 14 | −12.7763 | 0.800 | 1.834807 | 42.7 |
| 15 | 1106.0354 | 0.120 | | |
| 16 | 27.3028 | 2.220 | 1.620411 | 60.3 |
| 17 | 73.3536 | D17 | | |
| 18 | −27.1314 | 0.810 | 1.772499 | 49.6 |
| 19 | 96.3255 | 2.020 | 1.959060 | 17.5 |
| 20 | −305.7395 | D20 | | |

TABLE 1-continued

EXAMPLE 1 BASIC LENS DATA

| Si (SURFACE NUMBER) | Ri (CURVATURE RADIUS) | Di (SURFACE DISTANCE) | Ndj (REFRACTIVE INDEX) | vdj (ABBE NUMBER) |
|---|---|---|---|---|
| 21 | ∞(APERTURE STOP) | 1.590 | | |
| 22 | −286.9926 | 3.795 | 1.834807 | 42.7 |
| 23 | −34.0079 | 2.350 | | |
| 24 | 69.3024 | 6.580 | 1.516330 | 64.1 |
| 25 | −26.5704 | 0.800 | 1.882997 | 40.8 |
| 26 | −109.6605 | 30.155 | | |
| 27 | 1985.2014 | 4.909 | 1.517417 | 52.4 |
| 28 | −32.9537 | 0.120 | | |
| 29 | 51.2705 | 5.415 | 1.595220 | 67.7 |
| 30 | −36.1663 | 0.814 | 1.834807 | 42.7 |
| 31 | 29.8376 | 1.558 | | |
| 32 | 46.4607 | 8.753 | 1.595220 | 67.7 |
| 33 | −16.3624 | 0.958 | 1.882997 | 40.8 |
| 34 | −94.5752 | 6.323 | | |
| 35 | 1857.1031 | 5.359 | 1.696797 | 55.5 |
| 36 | −30.1887 | 0.000 | | |
| 37 | ∞ | 33.000 | 1.608589 | 46.4 |
| 38 | ∞ | 13.200 | 1.516329 | 64.1 |
| 39 | ∞ | 10.393 | | |

*ASPHERICAL SURFACE

TABLE 2

EXAMPLE 1 DATA ON ZOOM

| SPECIFICATION | WIDE ANGLE END | MIDDLE | TELEPHOTO END |
|---|---|---|---|
| f | 8.03 | 33.38 | 138.90 |
| Fno. | 1.85 | 1.85 | 2.63 |
| 2ω | 72.91 | 18.16 | 4.47 |
| D8 | 0.74 | 32.42 | 45.12 |
| D17 | 43.72 | 7.87 | 8.07 |
| D20 | 10.00 | 14.17 | 1.28 |

TABLE 3

EXAMPLE 1 ASPHERICAL SURFACE DATA

| | S2 | | S7 | | S8 |
|---|---|---|---|---|---|
| KA | −1.3663064 | KA | 0.5505184 | KA | 0.4985933 |
| RA3 | 3.7617092E−06 | RA3 | 1.2736705E−05 | RA3 | 1.3382205E−05 |
| RA4 | −2.7766876E−07 | RA4 | −1.2671016E−07 | RA4 | −2.4334792E−07 |
| RA5 | −6.8586438E−09 | RA5 | −3.4706183E−09 | RA5 | −7.2927792E−09 |
| RA6 | 1.5536130E−10 | RA6 | −1.3542558E−10 | RA6 | −3.0729075E−10 |
| RA7 | 3.7829969E−12 | RA7 | −5.5179026E−12 | RA7 | −4.0083228E−12 |
| RA8 | 7.5169781E−14 | RA8 | −7.1264055E−14 | RA8 | −6.8317457E−14 |
| RA9 | 6.9304268E−16 | RA9 | −2.2536623E−15 | RA9 | −5.3642835E−16 |
| RA10 | −2.6492972E−17 | RA10 | −5.9214144E−17 | RA10 | 2.5094028E−17 |
| RA11 | −1.6506476E−18 | RA11 | −1.2552772E−18 | RA11 | 1.5645198E−18 |
| RA12 | −4.8674379E−20 | RA12 | −2.4343150E−20 | RA12 | 6.0706596E−20 |
| RA13 | −7.9449044E−22 | RA13 | −2.6263612E−22 | RA13 | 1.9196184E−21 |
| RA14 | 2.6575477E−23 | RA14 | 6.6078256E−24 | RA14 | 5.5853771E−23 |
| RA15 | 2.2563584E−24 | RA15 | 7.4968410E−25 | RA15 | 1.6249674E−24 |
| RA16 | 6.1446541E−26 | RA16 | 4.3655771E−26 | RA16 | 5.6403987E−26 |
| RA17 | −4.0918665E−28 | RA17 | 2.1802818E−27 | RA17 | −2.3061948E−27 |
| RA18 | −1.7250485E−28 | RA18 | 9.9201698E−29 | RA18 | −6.5719690E−29 |
| RA19 | 3.4274273E−30 | RA19 | 4.0605448E−30 | RA19 | −9.8596355E−31 |
| RA20 | −9.5240375E−33 | RA20 | −1.8027295E−31 | RA20 | 4.2134425E−32 |

TABLE 4

EXAMPLE 2 BASIC LENS DATA

| Si (SURFACE NUMBER) | Ri (CURVATURE RADIUS) | Di (SURFACE DISTANCE) | Ndj (REFRACTIVE INDEX) | vdj (ABBE NUMBER) |
|---|---|---|---|---|
| 1 | −145.7504 | 1.767 | 1.755199 | 27.5 |
| *2 | 226.8650 | 12.117 | | |
| 3 | 437.8860 | 10.063 | 1.433871 | 95.2 |
| 4 | −99.6687 | 6.271 | | |
| 5 | 151.7725 | 8.667 | 1.433871 | 95.2 |
| 6 | −158.7771 | 0.120 | | |
| *7 | 44.4457 | 10.000 | 1.595220 | 67.7 |
| *8 | 242.4168 | D8 | | |
| 9 | 43.5353 | 0.800 | 2.001003 | 29.1 |
| 10 | 12.9702 | 5.720 | | |
| 11 | −62.7634 | 0.800 | 1.882997 | 40.8 |
| 12 | 54.1691 | 1.281 | | |
| 13 | 184.0151 | 5.707 | 1.808095 | 22.8 |
| 14 | −12.5910 | 0.800 | 1.834807 | 42.7 |
| 15 | 198.3882 | 0.120 | | |
| 16 | 28.6678 | 2.506 | 1.620411 | 60.3 |
| 17 | 118.4885 | D17 | | |
| 18 | −27.7821 | 0.810 | 1.772499 | 49.6 |
| 19 | 96.0813 | 2.192 | 1.959060 | 17.5 |
| 20 | −316.3890 | D20 | | |
| 21 | ∞(APERTURE STOP) | 1.760 | | |
| 22 | −229.7556 | 3.712 | 1.882997 | 40.8 |
| 23 | −34.4068 | 2.291 | | |
| 24 | 70.1113 | 6.434 | 1.516330 | 64.1 |
| 25 | −26.6554 | 0.800 | 1.882997 | 40.8 |
| 26 | −120.3603 | 30.319 | | |
| 27 | 74.2288 | 5.975 | 1.518229 | 58.9 |
| 28 | −37.9544 | 0.120 | | |
| 29 | 70.3221 | 4.519 | 1.595220 | 67.7 |
| 30 | −43.2892 | 0.800 | 1.882997 | 40.8 |
| 31 | 31.8868 | 1.996 | | |
| 32 | 61.1426 | 7.876 | 1.595220 | 67.7 |
| 33 | −16.7679 | 1.156 | 1.882997 | 40.8 |
| 34 | −74.0798 | 6.681 | | |
| 35 | 292.0314 | 5.033 | 1.677900 | 55.3 |
| 36 | −34.3381 | 0.000 | | |
| 37 | ∞ | 33.000 | 1.608589 | 46.4 |
| 38 | ∞ | 13.200 | 1.516329 | 64.1 |
| 39 | ∞ | 10.372 | | |

*ASPHERICAL SURFACE

TABLE 5

EXAMPLE 2 DATA ON ZOOM

| SPECIFICATION | WIDE ANGLE END | MIDDLE | TELEPHOTO END |
|---|---|---|---|
| f | 8.00 | 33.26 | 138.38 |
| Fno. | 1.85 | 1.85 | 2.65 |
| 2ω | 73.17 | 18.16 | 4.48 |

TABLE 5-continued

EXAMPLE 2 DATA ON ZOOM

| SPECIFICATION | WIDE ANGLE END | MIDDLE | TELEPHOTO END |
|---|---|---|---|
| D8 | 0.75 | 31.64 | 43.88 |
| D17 | 42.71 | 7.52 | 8.30 |
| D20 | 10.00 | 14.30 | 1.29 |

TABLE 6

EXAMPLE 2 ASPHERICAL SURFACE DATA

| | S2 | | S7 | | S8 |
|---|---|---|---|---|---|
| KA | −1.1778835 | KA | 0.4396491 | KA | 0.3625760 |
| RA3 | 4.0400475E−06 | RA3 | 1.3033009E−05 | RA3 | 1.3727039E−05 |
| RA4 | −3.1861278E−07 | RA4 | −1.4002638E−07 | RA4 | −4.5750879E−07 |
| RA5 | −3.9586055E−09 | RA5 | −2.2329731E−09 | RA5 | −7.4644500E−09 |
| RA6 | 1.7734959E−10 | RA6 | −1.1879484E−10 | RA6 | −2.7226852E−10 |
| RA7 | 3.5468494E−12 | RA7 | −5.1159563E−12 | RA7 | −2.3491445E−12 |
| RA8 | 6.3960290E−14 | RA8 | −5.0996932E−14 | RA8 | −1.3870639E−14 |
| RA9 | 5.3005036E−16 | RA9 | −1.4128712E−15 | RA9 | 8.7991146E−16 |
| RA10 | −2.6136079E−17 | RA10 | −3.1576107E−17 | RA10 | 5.4338058E−17 |
| RA11 | −1.9118042E−18 | RA11 | −4.8669673E−19 | RA11 | 1.9454261E−18 |
| RA12 | −5.8723069E−20 | RA12 | −5.1082022E−21 | RA12 | 5.7687095E−20 |

TABLE 6-continued

EXAMPLE 2 ASPHERICAL SURFACE DATA

| | S2 | | S7 | | S8 |
|---|---|---|---|---|---|
| RA13 | −1.2156635E−21 | RA13 | 1.9562103E−22 | RA13 | 1.4909769E−21 |
| RA14 | 2.8874708E−23 | RA14 | 1.7323590E−23 | RA14 | 3.7566007E−23 |
| RA15 | 2.9240789E−24 | RA15 | 9.8944182E−25 | RA15 | 1.0633827E−24 |
| RA16 | 8.4879250E−26 | RA16 | 4.8652571E−26 | RA16 | 4.7684156E−26 |
| RA17 | −4.3384731E−28 | RA17 | 2.2750270E−27 | RA17 | −3.4638561E−27 |
| RA18 | −2.3606584E−28 | RA18 | 1.0042412E−28 | RA18 | −8.8366011E−29 |
| RA19 | 5.2407358E−30 | RA19 | 4.0403627E−30 | RA19 | −1.0686887E−30 |
| RA20 | −2.6136189E−32 | RA20 | −2.7681342E−31 | RA20 | 6.5337829E−32 |

TABLE 7

EXAMPLE 3 BASIC LENS DATA

| Si (SURFACE NUMBER) | Ri (CURVATURE RADIUS) | Di (SURFACE DISTANCE) | Ndj (REFRACTIVE INDEX) | νdj (ABBE NUMBER) |
|---|---|---|---|---|
| *1 | 73931.7835 | 1.850 | 1.728250 | 28.5 |
| *2 | 73.5660 | 11.254 | | |
| 3 | 105.9394 | 10.782 | 1.433871 | 95.2 |
| 4 | −256.3628 | 7.322 | | |
| 5 | 76.6528 | 15.044 | 1.433871 | 95.2 |
| 6 | −138.5098 | 0.120 | | |
| *7 | 47.3994 | 6.135 | 1.729157 | 54.7 |
| *8 | 96.5029 | D8 | | |
| 9 | 52.8200 | 0.800 | 2.003300 | 28.3 |
| 10 | 13.3169 | 4.831 | | |
| 11 | −49.2531 | 0.800 | 1.882997 | 40.8 |
| 12 | 44.2249 | 0.000 | | |
| 13 | 44.2249 | 5.975 | 1.808095 | 22.8 |
| 14 | −14.9706 | 0.800 | 1.834807 | 42.7 |
| 15 | 75.2016 | 0.151 | | |
| 16 | 29.3858 | 4.324 | 1.669979 | 39.3 |
| 17 | −32.5600 | 0.000 | | |
| 18 | −32.5600 | 0.800 | 1.882997 | 40.8 |
| 19 | −266.4241 | D19 | | |
| 20 | −28.0676 | 2.949 | 1.846609 | 23.8 |
| 21 | −16.3517 | 0.800 | 1.816000 | 46.6 |
| 22 | −183.2018 | D22 | | |
| 23 | ∞(APERTURE STOP) | 1.683 | | |
| 24 | −1092.8889 | 3.511 | 1.816000 | 46.6 |
| 25 | −41.2137 | 0.120 | | |
| 26 | 61.6009 | 6.659 | 1.516330 | 64.1 |
| 27 | −29.5692 | 1.200 | 1.882997 | 40.8 |
| 28 | −98.0549 | 34.660 | | |
| 29 | −137.1313 | 3.741 | 1.517417 | 52.4 |
| 30 | −35.9861 | 2.910 | | |
| 31 | 35.5118 | 4.691 | 1.487490 | 70.2 |
| 32 | −1651.5867 | 1.200 | 1.806100 | 33.3 |
| 33 | 24.6400 | 0.801 | | |
| 34 | 23.9799 | 8.707 | 1.496999 | 81.5 |
| 35 | −25.2910 | 1.200 | 1.882997 | 40.8 |
| 36 | −138.8889 | 0.120 | | |
| 37 | 51.3415 | 4.064 | 1.595509 | 39.2 |
| 38 | −107.2742 | 0.000 | | |
| 39 | ∞ | 33.000 | 1.608589 | 46.4 |
| 40 | ∞ | 13.200 | 1.516329 | 64.1 |
| 41 | ∞ | 10.402 | | |

*ASPHERICAL SURFACE

TABLE 8

EXAMPLE 3 DATA ON ZOOM

| SPECIFICATION | WIDE ANGLE END | MIDDLE | TELEPHOTO END |
|---|---|---|---|
| f | 7.99 | 33.23 | 138.29 |
| Fno. | 1.85 | 1.85 | 2.57 |
| 2ω | 72.20 | 18.12 | 4.49 |
| D8 | 0.76 | 33.70 | 47.15 |

TABLE 8-continued

EXAMPLE 3 DATA ON ZOOM

| SPECIFICATION | WIDE ANGLE END | MIDDLE | TELEPHOTO END |
|---|---|---|---|
| D19 | 47.57 | 9.92 | 6.96 |
| D22 | 7.07 | 11.78 | 1.29 |

TABLE 9

EXAMPLE 3 ASPHERICAL SURFACE DATA

| | S1 | | S2 |
|---|---|---|---|
| KA | 3441742.532 | KA | 0.9213743 |
| RA3 | −4.3281005E−09 | RA3 | −2.9719006E−07 |
| RA4 | 3.2693908E−09 | RA4 | −3.9768425E−07 |
| RA5 | −1.2114590E−09 | RA5 | −2.0990464E−08 |
| RA6 | −9.2443457E−11 | RA6 | 1.4701309E−09 |
| RA7 | −1.0232162E−11 | RA7 | −5.3218774E−11 |
| RA8 | 7.9188096E−14 | RA8 | 3.9147260E−12 |
| RA9 | 5.5932920E−15 | RA9 | −3.9178879E−13 |
| RA10 | 1.0423342E−16 | RA10 | 1.4667374E−14 |
| RA11 | 4.1052828E−18 | RA11 | 9.4994335E−17 |
| RA12 | −4.4219110E−19 | RA12 | −1.2033022E−17 |
| RA13 | −1.2488797E−21 | RA13 | −1.7623975E−19 |
| RA14 | 4.9509317E−22 | RA14 | 3.9469282E−21 |
| RA15 | −1.0561123E−23 | RA15 | 6.8293608E−22 |
| RA16 | 1.5253828E−26 | RA16 | −1.4733149E−23 |

TABLE 9-continued

EXAMPLE 3 ASPHERICAL SURFACE DATA

| RA17 | 2.3132153E−27 | RA17 | −4.6513406E−25 |
|---|---|---|---|
| RA18 | −1.8564366E−29 | RA18 | 1.9241186E−26 |
| RA19 | −3.2085302E−31 | RA19 | −2.1573764E−28 |
| RA20 | 4.0665823E−33 | RA20 | 6.5016630E−31 |

| | S7 | | S8 |
|---|---|---|---|
| KA | −0.0171834 | KA | −7.0378813 |
| RA3 | −9.8064920E−10 | RA3 | 6.8435247E−11 |
| RA4 | −8.4629380E−08 | RA4 | 5.1482428E−10 |
| RA5 | −2.2276016E−09 | RA5 | 1.2350871E−10 |
| RA6 | 1.1600379E−10 | RA6 | 5.3976774E−12 |
| RA7 | −3.0621416E−13 | RA7 | 7.4396328E−13 |
| RA8 | 1.2255314E−13 | RA8 | 1.1621566E−14 |
| RA9 | −7.9954556E−15 | RA9 | −7.2824320E−16 |
| RA10 | 1.6740142E−16 | RA10 | 1.0413072E−16 |
| RA11 | 3.3439125E−19 | RA11 | −2.3477575E−18 |
| RA12 | 8.4617985E−21 | RA12 | −4.6788662E−20 |
| RA13 | −1.6897703E−20 | RA13 | 2.6680742E−21 |
| RA14 | 1.0325474E−21 | RA14 | 1.1800639E−23 |
| RA15 | −1.0616159E−23 | RA15 | 2.5890775E−25 |
| RA16 | −9.5135143E−25 | RA16 | −1.4921559E−25 |
| RA17 | 2.9761234E−26 | RA17 | 3.2515467E−27 |
| RA18 | 5.7235116E−29 | RA18 | 7.7025431E−29 |
| RA19 | −1.2878619E−29 | RA19 | −3.4181202E−30 |
| RA20 | 1.4076695E−31 | RA20 | 3.2764429E−32 |

TABLE 10

EXAMPLE 4 BASIC LENS DATA

| Si (SURFACE NUMBER) | Ri (CURVATURE RADIUS) | Di (SURFACE DISTANCE) | Ndj (REFRACTIVE INDEX) | vdj (ABBE NUMBER) |
|---|---|---|---|---|
| *1 | 19250.0713 | 1.850 | 1.846660 | 23.8 |
| *2 | 119.1805 | 21.019 | | |
| *3 | 108.0924 | 17.081 | 1.433871 | 95.2 |
| *4 | −92.4908 | 0.120 | | |
| *5 | 39.3325 | 10.432 | 1.569075 | 71.3 |
| *6 | 192.6981 | D6 | | |
| 7 | 55.9655 | 1.473 | 2.003300 | 28.3 |
| 8 | 13.4603 | 4.572 | | |
| 9 | −58.1540 | 0.800 | 1.882997 | 40.8 |
| 10 | 25.7664 | 0.341 | | |
| 11 | 29.0351 | 5.830 | 1.808095 | 22.8 |
| 12 | −17.7549 | 1.084 | 1.834807 | 42.7 |
| 13 | 143.3328 | 0.120 | | |
| 14 | 27.6905 | 4.912 | 1.669979 | 39.3 |
| 15 | −25.4056 | 0.343 | | |
| 16 | −28.1562 | 0.800 | 1.882997 | 40.8 |
| 17 | 168.8279 | D17 | | |
| 18 | −27.8881 | 2.983 | 1.846609 | 23.8 |
| 19 | −15.8448 | 0.822 | 1.816000 | 46.6 |
| 20 | −167.9113 | D20 | | |
| 21 | ∞(APERTURE STOP) | 1.705 | | |
| 22 | 3415.6848 | 4.025 | 1.816000 | 46.6 |
| 23 | −35.8061 | 0.120 | | |
| 24 | 53.1101 | 6.581 | 1.516330 | 64.1 |
| 25 | −29.4083 | 1.200 | 1.882997 | 40.8 |
| 26 | −212.1084 | 37.616 | | |
| 27 | −72.8182 | 3.220 | 1.517417 | 52.4 |
| 28 | −32.2461 | 0.525 | | |
| 29 | 34.7906 | 4.254 | 1.487490 | 70.2 |
| 30 | 263.3223 | 1.321 | 1.806100 | 33.3 |
| 31 | 22.1962 | 0.956 | | |
| 32 | 23.1843 | 8.596 | 1.496999 | 81.5 |
| 33 | −23.1807 | 1.200 | 1.882997 | 40.8 |
| 34 | −133.3979 | 2.328 | | |
| 35 | 61.3626 | 6.440 | 1.595509 | 39.2 |
| 36 | −49.7440 | 0.000 | | |
| 37 | ∞ | 33.000 | 1.608589 | 46.4 |

TABLE 10-continued

EXAMPLE 4 BASIC LENS DATA

| Si (SURFACE NUMBER) | Ri (CURVATURE RADIUS) | Di (SURFACE DISTANCE) | Ndj (REFRACTIVE INDEX) | νdj (ABBE NUMBER) |
|---|---|---|---|---|
| 38 | ∞ | 13.200 | 1.516329 | 64.1 |
| 39 | ∞ | 9.979 | | |

*ASPHERICAL SURFACE

TABLE 11

EXAMPLE 4 DATA ON ZOOM

| SPECI-FICATION | WIDE ANGLE END | MIDDLE | TELEPHOTO END |
|---|---|---|---|
| f | 8.14 | 33.86 | 140.87 |
| Fno. | 1.85 | 1.85 | 2.66 |
| 2ω | 73.25 | 17.79 | 4.40 |
| D6 | 0.18 | 31.46 | 44.16 |
| D17 | 44.21 | 8.10 | 6.90 |
| D20 | 7.47 | 12.30 | 0.80 |

TABLE 12

EXAMPLE 4 ASPHERICAL SURFACE DATA

| | S1 | | S2 | | S3 |
|---|---|---|---|---|---|
| KA | −1864033.76 | KA | 0.5179776 | KA | 1.0491594 |
| RA3 | 1.8649329E−09 | RA3 | −6.5337185E−08 | | |
| RA4 | 3.3842531E−08 | RA4 | −4.8552459E−07 | | |
| RA5 | −1.7883095E−10 | RA5 | 7.5972612E−08 | | |
| RA6 | −2.6014162E−10 | RA6 | −1.7220108E−08 | | |
| RA7 | −1.4137801E−11 | RA7 | 1.9206569E−09 | | |
| RA8 | 1.6700600E−13 | RA8 | −1.1770201E−10 | | |
| RA9 | 1.1529961E−14 | RA9 | 3.9220239E−12 | | |
| RA10 | 7.2589690E−17 | RA10 | −7.1071158E−14 | | |
| RA11 | 4.8170255E−19 | RA11 | 1.3954497E−15 | | |
| RA12 | −3.6942684E−19 | RA12 | −4.1700719E−17 | | |
| RA13 | 3.6534054E−21 | RA13 | −1.9180600E−19 | | |
| RA14 | −3.8119511E−23 | RA14 | 3.4079837E−20 | | |
| RA15 | 2.6773459E−24 | RA15 | 1.8252856E−22 | | |
| RA16 | −2.3144358E−26 | RA16 | −1.8570010E−23 | | |
| RA17 | 9.8136162E−29 | RA17 | −3.0089692E−25 | | |
| RA18 | −1.6374964E−29 | RA18 | 1.2227463E−26 | | |
| RA19 | 3.9890072E−31 | RA19 | 2.4150396E−30 | | |
| RA20 | −3.0836638E−33 | RA20 | −1.4867336E−30 | | |
| | S4 | | S5 | | S6 |
| KA | 1.0489624 | KA | 0.3775891 | KA | −6.3483270 |
| RA3 | 6.4913990E−10 | RA3 | 8.1913907E−11 | | |
| RA4 | −4.5415466E−07 | RA4 | −1.8476134E−07 | | |
| RA5 | 1.7648217E−09 | RA5 | −4.3350111E−09 | | |
| RA6 | 2.5059298E−11 | RA6 | 1.5025076E−10 | | |
| RA7 | 4.7483240E−13 | RA7 | 1.9030059E−12 | | |
| RA8 | −1.3972165E−14 | RA8 | 1.3822279E−13 | | |
| RA9 | −4.4008327E−16 | RA9 | −1.0283831E−14 | | |
| RA10 | 3.5993526E−17 | RA10 | 1.0142978E−16 | | |
| RA11 | −1.2695144E−18 | RA11 | 8.2349309E−18 | | |
| RA12 | 5.2428578E−20 | RA12 | −2.1780895E−19 | | |
| RA13 | −1.8500573E−21 | RA13 | −5.6997331E−21 | | |
| RA14 | 1.6419129E−23 | RA14 | 2.1343089E−22 | | |
| RA15 | 9.1629985E−25 | RA15 | 3.9536497E−24 | | |
| RA16 | −1.3434640E−26 | RA16 | −1.1873790E−25 | | |
| RA17 | −7.6690849E−28 | RA17 | −4.4223628E−27 | | |
| RA18 | 2.7618306E−29 | RA18 | 1.3258759E−28 | | |
| RA19 | −3.4190693E−31 | RA19 | −3.6299671E−32 | | |
| RA20 | 1.5068724E−33 | RA20 | −1.6408449E−32 | | |

TABLE 13

EXAMPLE 5 BASIC LENS DATA

| Si (SURFACE NUMBER) | Ri (CURVATURE RADIUS) | Di (SURFACE DISTANCE) | Ndj (REFRACTIVE INDEX) | vdj (ABBE NUMBER) |
|---|---|---|---|---|
| *1 | 897.6297 | 1.850 | 1.805181 | 25.4 |
| *2 | 92.0187 | 23.595 | | |
| *3 | 101.8243 | 15.732 | 1.433871 | 95.2 |
| *4 | −117.4187 | 0.120 | | |
| *5 | 41.0704 | 10.197 | 1.569075 | 71.3 |
| *6 | 322.2100 | D6 | | |
| 7 | 49.6509 | 0.800 | 2.003300 | 28.3 |
| 8 | 12.9667 | 4.898 | | |
| 9 | −59.7435 | 0.800 | 1.882997 | 40.8 |
| 10 | 34.5968 | 0.120 | | |
| 11 | 25.1490 | 5.934 | 1.808095 | 22.8 |
| 12 | −18.9122 | 0.800 | 1.834807 | 42.7 |
| 13 | 94.7311 | 0.120 | | |
| 14 | 32.0059 | 4.514 | 1.669979 | 39.3 |
| 15 | −24.7806 | 0.120 | | |
| 16 | −24.3940 | 0.800 | 1.882997 | 40.8 |
| 17 | 177.0993 | D17 | | |
| 18 | −26.1475 | 3.295 | 1.846609 | 23.8 |
| 19 | −15.7555 | 0.800 | 1.816000 | 46.6 |
| 20 | −156.4289 | D20 | | |
| 21 | ∞(APERTURE STOP) | 1.600 | | |
| 22 | 717373.8675 | 4.200 | 1.816000 | 46.6 |
| 23 | −36.3545 | 0.120 | | |
| 24 | 54.9634 | 7.344 | 1.516330 | 64.1 |
| 25 | −29.3178 | 1.200 | 1.882997 | 40.8 |
| 26 | −114.1687 | 30.139 | | |
| 27 | −59.6741 | 3.361 | 1.517417 | 52.4 |
| 28 | −31.9622 | 0.500 | | |
| 29 | 30.8945 | 5.925 | 1.487490 | 70.2 |
| 30 | 1374.8591 | 1.200 | 1.806100 | 33.3 |
| 31 | 21.4373 | 1.095 | | |
| 32 | 22.4383 | 8.561 | 1.496999 | 81.5 |
| 33 | −24.3572 | 1.200 | 1.882997 | 40.8 |
| 34 | −133.1291 | 0.120 | | |
| 35 | 62.3256 | 8.890 | 1.595509 | 39.2 |
| 36 | −56.5991 | 0.000 | | |
| 37 | ∞ | 33.000 | 1.608589 | 46.4 |
| 38 | ∞ | 13.200 | 1.516329 | 64.1 |
| 39 | ∞ | 10.417 | | |

*ASPHERICAL SURFACE

TABLE 14

EXAMPLE 5 DATA ON ZOOM

| SPECIFICATION | WIDE ANGLE END | MIDDLE | TELEPHOTO END |
|---|---|---|---|
| f | 7.99 | 33.23 | 138.30 |
| Fno. | 1.85 | 1.85 | 2.76 |
| 2ω | 73.29 | 18.33 | 4.52 |
| D6 | 0.76 | 34.24 | 48.26 |
| D17 | 50.08 | 11.83 | 5.89 |
| D20 | 4.59 | 9.56 | 1.29 |

TABLE 15

EXAMPLE 5 ASPHERICAL SURFACE DATA

| | S1 | | S2 | | S3 |
|---|---|---|---|---|---|
| KA | 454.0377539 | KA | 0.5103112 | KA | 0.9833613 |
| RA3 | −4.5215536E−09 | RA3 | −8.2596962E−07 | RA3 | −4.6990798E−10 |
| RA4 | 8.8467797E−08 | RA4 | 9.4984098E−07 | RA4 | 2.1752122E−06 |
| RA5 | 4.3632197E−09 | RA5 | −1.2790308E−07 | RA5 | −3.5474427E−08 |
| RA6 | −7.3588643E−11 | RA6 | 1.3226034E−08 | RA6 | 3.1311152E−10 |
| RA7 | −2.5894248E−11 | RA7 | −8.3904625E−10 | RA7 | −6.6018617E−12 |
| RA8 | 3.3450822E−13 | RA8 | 2.8623200E−11 | RA8 | 4.7649549E−13 |
| RA9 | −1.3205382E−14 | RA9 | −5.1792831E−13 | RA9 | −2.0224383E−14 |
| RA10 | 1.5286139E−15 | RA10 | 1.0897982E−14 | RA10 | 5.4608464E−16 |
| RA11 | −2.8006267E−17 | RA11 | −2.0036372E−16 | RA11 | −1.4807184E−17 |
| RA12 | −4.6151022E−19 | RA12 | −1.1439643E−17 | RA12 | 5.7587573E−19 |

TABLE 15-continued

EXAMPLE 5 ASPHERICAL SURFACE DATA

| | | | | | |
|---|---|---|---|---|---|
| RA13 | 1.7177636E−20 | RA13 | −1.9771592E−19 | RA13 | −1.2169472E−20 |
| RA14 | −2.2235662E−22 | RA14 | 5.7482255E−20 | RA14 | −2.4536806E−22 |
| RA15 | 2.8043687E−24 | RA15 | −1.3000243E−21 | RA15 | 1.8095127E−23 |
| RA16 | −3.8862106E−26 | RA16 | −2.9326240E−23 | RA16 | −3.2490576E−25 |
| RA17 | 8.0509865E−28 | RA17 | 1.3783589E−24 | RA17 | 2.0711436E−27 |
| RA18 | −3.4367313E−30 | RA18 | −1.0196546E−26 | RA18 | −3.5227845E−29 |
| RA19 | −2.5541417E−31 | RA19 | −1.5763837E−28 | RA19 | 1.1645844E−30 |
| RA20 | 2.9266161E−33 | RA20 | 1.9561968E−30 | RA20 | −1.0558724E−32 |

| | S4 | | S5 | | S6 |
|---|---|---|---|---|---|
| KA | 0.9549391 | KA | 0.2811123 | KA | 7.5073210 |
| | | RA3 | 1.7915840E−09 | RA3 | −1.8012696E−10 |
| | | RA4 | −7.0846478E−07 | RA4 | 1.4571868E−10 |
| | | RA5 | 3.0609705E−09 | RA5 | −3.0392698E−11 |
| | | RA6 | 2.7242021E−11 | RA6 | 6.3227492E−12 |
| | | RA7 | 5.7594980E−13 | RA7 | −1.6111512E−13 |
| | | RA8 | 6.5856085E−14 | RA8 | 1.2550481E−14 |
| | | RA9 | −4.0191094E−15 | RA9 | 2.1136423E−15 |
| | | RA10 | −2.7889885E−16 | RA10 | −2.4600463E−17 |
| | | RA11 | 3.4028720E−17 | RA11 | 1.1384397E−18 |
| | | RA12 | −1.2978375E−18 | RA12 | 9.7466003E−20 |
| | | RA13 | 2.3143562E−20 | RA13 | −2.0956719E−21 |
| | | RA14 | −1.6205588E−22 | RA14 | 1.0036771E−23 |
| | | RA15 | −2.1042272E−23 | RA15 | −4.1668606E−24 |
| | | RA16 | 1.7424049E−24 | RA16 | 7.7554721E−26 |
| | | RA17 | −4.5460611E−26 | RA17 | 1.2910440E−27 |
| | | RA18 | −2.1830369E−29 | RA18 | −3.2363647E−29 |
| | | RA19 | 1.8253272E−29 | RA19 | 8.5584719E−32 |
| | | RA20 | −2.1008500E−31 | RA20 | 7.3713898E−34 |

TABLE 16

EXAMPLE 6 BASIC LENS DATA

| Si (SURFACE NUMBER) | Ri (CURVATURE RADIUS) | Di (SURFACE DISTANCE) | Ndj (REFRACTIVE INDEX) | νdj (ABBE NUMBER) |
|---|---|---|---|---|
| *1 | −5831.6275 | 1.850 | 1.805181 | 25.4 |
| *2 | 94.5187 | 23.131 | | |
| *3 | 129.8679 | 15.121 | 1.433871 | 95.2 |
| *4 | −122.0668 | 0.120 | | |
| *5 | 36.8256 | 11.187 | 1.569075 | 71.3 |
| *6 | 314.7516 | D6 | | |
| 7 | 45.3039 | 0.800 | 2.003300 | 28.3 |
| 8 | 14.4032 | 4.468 | | |
| 9 | −44.9979 | 0.800 | 1.882997 | 40.8 |
| 10 | 55.8722 | 1.418 | | |
| 11 | −72.5468 | 0.800 | 1.834807 | 42.7 |
| 12 | 18.2493 | 4.837 | 1.808095 | 22.8 |
| 13 | −45.0629 | 0.120 | | |
| 14 | 25.9286 | 5.063 | 1.669979 | 39.3 |
| 15 | −26.9911 | 0.120 | | |
| 16 | −26.7292 | 0.800 | 1.882997 | 40.8 |
| 17 | 78.5731 | D17 | | |
| 18 | −25.1001 | 3.389 | 1.846609 | 23.8 |
| 19 | −14.8443 | 0.800 | 1.816000 | 46.6 |
| 20 | −162.8142 | D20 | | |
| 21 | ∞(APERTURE STOP) | 1.605 | | |
| 22 | −19965.9854 | 4.211 | 1.816000 | 46.6 |
| 23 | −37.5017 | 0.120 | | |
| 24 | 59.6504 | 7.606 | 1.516330 | 64.1 |
| 25 | −28.7781 | 1.200 | 1.882997 | 40.8 |
| 26 | −99.8495 | 29.036 | | |
| 27 | −63.8605 | 3.288 | 1.517417 | 52.4 |
| 28 | −32.4332 | 2.703 | | |
| 29 | 31.1352 | 5.278 | 1.487490 | 70.2 |
| 30 | −683.3121 | 1.200 | 1.806100 | 33.3 |
| 31 | 21.8211 | 1.073 | | |
| 32 | 22.7054 | 8.575 | 1.496999 | 81.5 |
| 33 | −23.9376 | 1.200 | 1.882997 | 40.8 |
| 34 | −137.5625 | 0.120 | | |
| 35 | 64.1092 | 7.746 | 1.595509 | 39.2 |

TABLE 16-continued

EXAMPLE 6 BASIC LENS DATA

| Si (SURFACE NUMBER) | Ri (CURVATURE RADIUS) | Di (SURFACE DISTANCE) | Ndj (REFRACTIVE INDEX) | vdj (ABBE NUMBER) |
|---|---|---|---|---|
| 36 | −53.8530 | 0.000 | | |
| 37 | ∞ | 33.000 | 1.608589 | 46.4 |
| 38 | ∞ | 13.200 | 1.516329 | 64.1 |
| 39 | ∞ | 10.870 | | |

*ASPHERICAL SURFACE

TABLE 17

EXAMPLE 6 DATA ON ZOOM

| SPECI-FICATION | WIDE ANGLE END | MIDDLE | TELEPHOTO END |
|---|---|---|---|
| f | 7.99 | 33.24 | 138.31 |
| Fno. | 1.85 | 1.85 | 2.80 |
| 2ω | 73.27 | 18.34 | 4.52 |
| D6 | 0.76 | 33.98 | 47.68 |
| D17 | 47.75 | 10.61 | 6.18 |
| D20 | 6.64 | 10.55 | 1.29 |

TABLE 18

EXAMPLE 6 ASPHERICAL SURFACE DATA

| | S1 | | S2 | | S3 |
|---|---|---|---|---|---|
| KA | 16967.88331 | KA | −0.2401877 | KA | 1.7884627 |
| RA3 | 4.1830096E−09 | RA3 | 1.0933888E−06 | RA3 | 1.1375067E−08 |
| RA4 | 3.1990269E−07 | RA4 | −6.6487023E−07 | RA4 | 3.0907048E−06 |
| RA5 | 1.2579194E−08 | RA5 | 1.9392291E−07 | RA5 | −3.9797473E−08 |
| RA6 | −4.6660597E−10 | RA6 | −2.1189796E−08 | RA6 | 1.8254164E−10 |
| RA7 | −2.6484249E−11 | RA7 | 1.0744649E−09 | RA7 | −9.2554290E−12 |
| RA8 | 2.8147627E−13 | RA8 | 6.6692779E−12 | RA8 | 1.3291753E−12 |
| RA9 | 2.7641433E−14 | RA9 | −3.5239362E−12 | RA9 | −7.9289258E−14 |
| RA10 | −1.7400989E−16 | RA10 | 1.4895050E−13 | RA10 | 2.1079618E−15 |
| RA11 | −5.3767031E−18 | RA11 | −1.1684198E−15 | RA11 | 9.8153688E−19 |
| RA12 | −2.6622196E−19 | RA12 | −5.1648065E−17 | RA12 | −1.1494342E−18 |
| RA13 | 3.7263593E−21 | RA13 | 2.8149642E−19 | RA13 | −6.9650719E−21 |
| RA14 | 3.5150290E−23 | RA14 | 1.0408695E−20 | RA14 | 1.7010164E−21 |
| RA15 | 1.7369936E−24 | RA15 | 8.7248018E−22 | RA15 | −4.1781432E−23 |
| RA16 | −1.0458882E−26 | RA16 | −8.5098920E−24 | RA16 | 1.6679920E−25 |
| RA17 | −6.6717155E−28 | RA17 | −7.2943837E−25 | RA17 | 1.1662903E−26 |
| RA18 | −6.1218838E−29 | RA18 | 4.3097701E−27 | RA18 | −3.0840355E−28 |
| RA19 | 2.2155234E−30 | RA19 | 3.5426746E−28 | RA19 | 3.8605675E−30 |
| RA20 | −1.9001987E−32 | RA20 | −4.4443177E−30 | RA20 | −2.1256737E−32 |

| | S4 | | S5 | | S6 |
|---|---|---|---|---|---|
| KA | 0.3682536 | KA | 0.0622074 | KA | 49.5678907 |
| | | RA3 | 1.1508217E−08 | RA3 | −5.8879709E−12 |
| | | RA4 | −8.4873469E−07 | RA4 | 3.2179293E−11 |
| | | RA5 | 1.6849689E−08 | RA5 | 3.0730246E−12 |
| | | RA6 | 2.3344813E−10 | RA6 | 1.7308205E−12 |
| | | RA7 | −1.2176147E−11 | RA7 | −2.4138196E−14 |
| | | RA8 | 1.2224624E−12 | RA8 | 9.8081795E−15 |
| | | RA9 | −6.7665660E−14 | RA9 | 2.5851908E−16 |
| | | RA10 | −2.9762861E−16 | RA10 | −1.9063901E−17 |
| | | RA11 | 1.2654899E−16 | RA11 | 1.4690533E−18 |
| | | RA12 | −2.7018170E−19 | RA12 | −1.7023894E−20 |
| | | RA13 | −2.4394044E−19 | RA13 | −1.3026906E−22 |
| | | RA14 | 5.8736166E−21 | RA14 | −1.9011425E−23 |
| | | RA15 | 3.9230282E−23 | RA15 | 1.2651883E−24 |
| | | RA16 | −5.8705575E−25 | RA16 | −4.5249160E−27 |
| | | RA17 | −6.0643519E−27 | RA17 | −8.7669323E−28 |
| | | RA18 | −4.7280416E−27 | RA18 | 9.5877776E−30 |
| | | RA19 | 1.7585559E−28 | RA19 | 2.7832171E−31 |
| | | RA20 | −1.7677849E−30 | RA20 | −4.5046278E−33 |

TABLE 19

EXAMPLE 7 BASIC LENS DATA

| Si (SURFACE NUMBER) | Ri (CURVATURE RADIUS) | Di (SURFACE DISTANCE) | Ndj (REFRACTIVE INDEX) | νdj (ABBE NUMBER) |
|---|---|---|---|---|
| *1 | 184.9122 | 1.850 | 1.846660 | 23.8 |
| *2 | 75.0028 | 22.791 | | |
| *3 | 69.7945 | 18.761 | 1.433871 | 95.2 |
| *4 | −119.2499 | 0.120 | | |
| *5 | 39.1352 | 9.043 | 1.592399 | 68.3 |
| *6 | 129.5047 | D6 | | |
| 7 | 66.8640 | 0.800 | 2.003300 | 28.3 |
| 8 | 12.1474 | 4.732 | | |
| 9 | −44.2172 | 0.800 | 1.882997 | 40.8 |
| 10 | 32.2799 | 0.350 | | |
| 11 | 31.2885 | 5.826 | 1.808095 | 22.8 |
| 12 | −17.2924 | 0.800 | 1.834807 | 42.7 |
| 13 | 129.4573 | 0.120 | | |
| 14 | 34.5508 | 4.860 | 1.669979 | 39.3 |
| 15 | −21.3144 | 0.120 | | |
| 16 | −26.0639 | 0.800 | 1.882997 | 40.8 |
| 17 | −711.9185 | D17 | | |
| 18 | −28.7748 | 2.945 | 1.846609 | 23.8 |
| 19 | −16.8284 | 0.800 | 1.816000 | 46.6 |
| 20 | −154.5490 | D20 | | |
| 21 | ∞(APERTURE STOP) | 1.600 | | |
| 22 | −463311.0549 | 4.178 | 1.816000 | 46.6 |
| 23 | −34.1041 | 1.186 | | |
| 24 | 52.6827 | 6.936 | 1.516330 | 64.1 |
| 25 | −27.6644 | 1.200 | 1.882997 | 40.8 |
| 26 | −201.7755 | 34.035 | | |
| 27 | −58.0863 | 3.092 | 1.517417 | 52.4 |
| 28 | −29.8853 | 0.500 | | |
| 29 | 35.0548 | 3.727 | 1.487490 | 70.2 |
| 30 | 117.0666 | 1.200 | 1.806100 | 33.3 |
| 31 | 20.8337 | 1.075 | | |
| 32 | 22.0239 | 9.489 | 1.496999 | 81.5 |
| 33 | −19.9464 | 1.200 | 1.882997 | 40.8 |
| 34 | −101.3946 | 3.108 | | |
| 35 | 139.0809 | 5.043 | 1.595509 | 39.2 |
| 36 | −33.7161 | 0.000 | | |
| 37 | ∞ | 33.000 | 1.608589 | 46.4 |
| 38 | ∞ | 13.200 | 1.516329 | 64.1 |
| 39 | ∞ | 10.401 | | |

*ASPHERICAL SURFACE

TABLE 20

EXAMPLE 7 DATA ON ZOOM

| SPECIFICATION | WIDE ANGLE END | MIDDLE | TELEPHOTO END |
|---|---|---|---|
| f | 8.00 | 33.24 | 138.32 |
| Fno. | 1.85 | 1.85 | 2.50 |
| 2ω | 72.73 | 18.05 | 4.47 |

TABLE 20-continued

EXAMPLE 7 DATA ON ZOOM

| SPECIFICATION | WIDE ANGLE END | MIDDLE | TELEPHOTO END |
|---|---|---|---|
| D6 | 0.76 | 31.50 | 43.68 |
| D17 | 44.70 | 8.80 | 7.35 |
| D20 | 6.86 | 12.02 | 1.29 |

TABLE 21

EXAMPLE 7 ASPHERICAL SURFACE DATA

| | S1 | | S2 | | S3 |
|---|---|---|---|---|---|
| KA | −78.8852818 | KA | 0.6258987 | KA | 0.6369544 |
| RA3 | −6.6737511E−08 | RA3 | 1.7750154E−06 | RA3 | −7.5836675E−09 |
| RA4 | 1.0117327E−06 | RA4 | −2.1630705E−06 | RA4 | 4.1289996E−07 |
| RA5 | 1.9668075E−08 | RA5 | 3.0269531E−07 | RA5 | 3.8745573E−08 |
| RA6 | −2.5603230E−09 | RA6 | −2.9994190E−08 | RA6 | −7.4456440E−10 |
| RA7 | 1.4081940E−10 | RA7 | 1.8106408E−09 | RA7 | −2.3245557E−12 |
| RA8 | −1.4745833E−11 | RA8 | −6.4431289E−11 | RA8 | −4.5141424E−14 |
| RA9 | 7.4998759E−13 | RA9 | 1.5700083E−12 | RA9 | 5.0798505E−15 |
| RA10 | −1.1763097E−14 | RA10 | −6.6327808E−14 | RA10 | −1.8973964E−17 |
| RA11 | −3.5604795E−16 | RA11 | 2.9642614E−15 | RA11 | −5.0618843E−18 |
| RA12 | 1.6544608E−17 | RA12 | −4.2195386E−17 | RA12 | −4.0679853E−21 |

TABLE 21-continued

EXAMPLE 7 ASPHERICAL SURFACE DATA

| RA13 | −1.9909847E−19 | RA13 | −4.4832045E−19 | RA13 | 7.0459746E−21 |
|---|---|---|---|---|---|
| RA14 | 6.3037815E−21 | RA14 | −2.5381970E−20 | RA14 | −1.7133415E−22 |
| RA15 | −4.9259044E−22 | RA15 | 1.1033476E−21 | RA15 | 4.7372063E−24 |
| RA16 | 1.3924105E−23 | RA16 | 3.6506311E−23 | RA16 | −2.0868413E−25 |
| RA17 | −1.0125057E−25 | RA17 | −1.3514532E−24 | RA17 | 2.2214256E−27 |
| RA18 | −2.2831451E−27 | RA18 | −1.4390093E−26 | RA18 | 1.0557862E−28 |
| RA19 | 4.8170120E−29 | RA19 | 8.5943045E−28 | RA19 | −2.9958137E−30 |
| RA20 | −2.6335232E−31 | RA20 | −7.7590913E−30 | RA20 | 2.2303490E−32 |

| | S4 | | S5 | | S6 |
|---|---|---|---|---|---|
| KA | 2.4320142 | KA | 0.6106775 | KA | 2.4452641 |
| | | RA3 | −1.2402284E−08 | RA3 | −1.2413609E−10 |
| | | RA4 | −4.9359419E−07 | RA4 | 1.3576906E−10 |
| | | RA5 | −1.3985007E−08 | RA5 | −3.8343432E−11 |
| | | RA6 | 1.1870378E−10 | RA6 | 1.0345579E−11 |
| | | RA7 | −1.5397197E−11 | RA7 | −7.1918129E−13 |
| | | RA8 | 4.1130911E−13 | RA8 | 6.8426222E−14 |
| | | RA9 | −2.4058682E−14 | RA9 | 1.0600871E−15 |
| | | RA10 | 3.0001719E−15 | RA10 | −2.2488897E−17 |
| | | RA11 | −1.3918333E−16 | RA11 | 5.3790836E−18 |
| | | RA12 | −4.2629599E−19 | RA12 | 8.4807004E−20 |
| | | RA13 | 1.8590187E−19 | RA13 | −3.1562442E−21 |
| | | RA14 | −2.5395836E−21 | RA14 | −1.7736287E−22 |
| | | RA15 | −1.9212559E−23 | RA15 | 1.8043809E−24 |
| | | RA16 | −3.9839276E−24 | RA16 | −1.0641911E−25 |
| | | RA17 | 8.5220042E−26 | RA17 | 5.8002033E−27 |
| | | RA18 | 6.0612494E−27 | RA18 | −1.6902941E−29 |
| | | RA19 | −2.3104242E−28 | RA19 | −1.3096898E−30 |
| | | RA20 | 2.2507518E−30 | RA20 | 6.7628776E−33 |

The focusing method of the zoom lens of each example when an object distance has fluctuated may be, for example, as follows. The zoom lenses of Examples 1 through 3 may adopt an inner focus method, in which only the lenses L13 and L14 in the first lens group G1 are moved during focusing. The zoom lens of Example 4 may adopt a whole-group extension method in which the whole first lens group G1 is moved in an integrated manner during focusing. The zoom lenses of Examples 5 through 7 may adopt a floating focus method in which a first sub-lens-group consisting of lenses L11 and L12 and a second sub-lens-group consisting of lenses L13 and L14 move independently of each other during focusing. The aforementioned focusing method of each example is not an absolute method, and a focus method other than the aforementioned method may be adopted.

Table 22 shows values corresponding to formulas (1) through (5) in the zoom lenses of Examples 1 through 7. In Examples 1 through 7, d-line is used as a reference wavelength, and Table 22 shows values at the reference wavelength.

Figure 8:
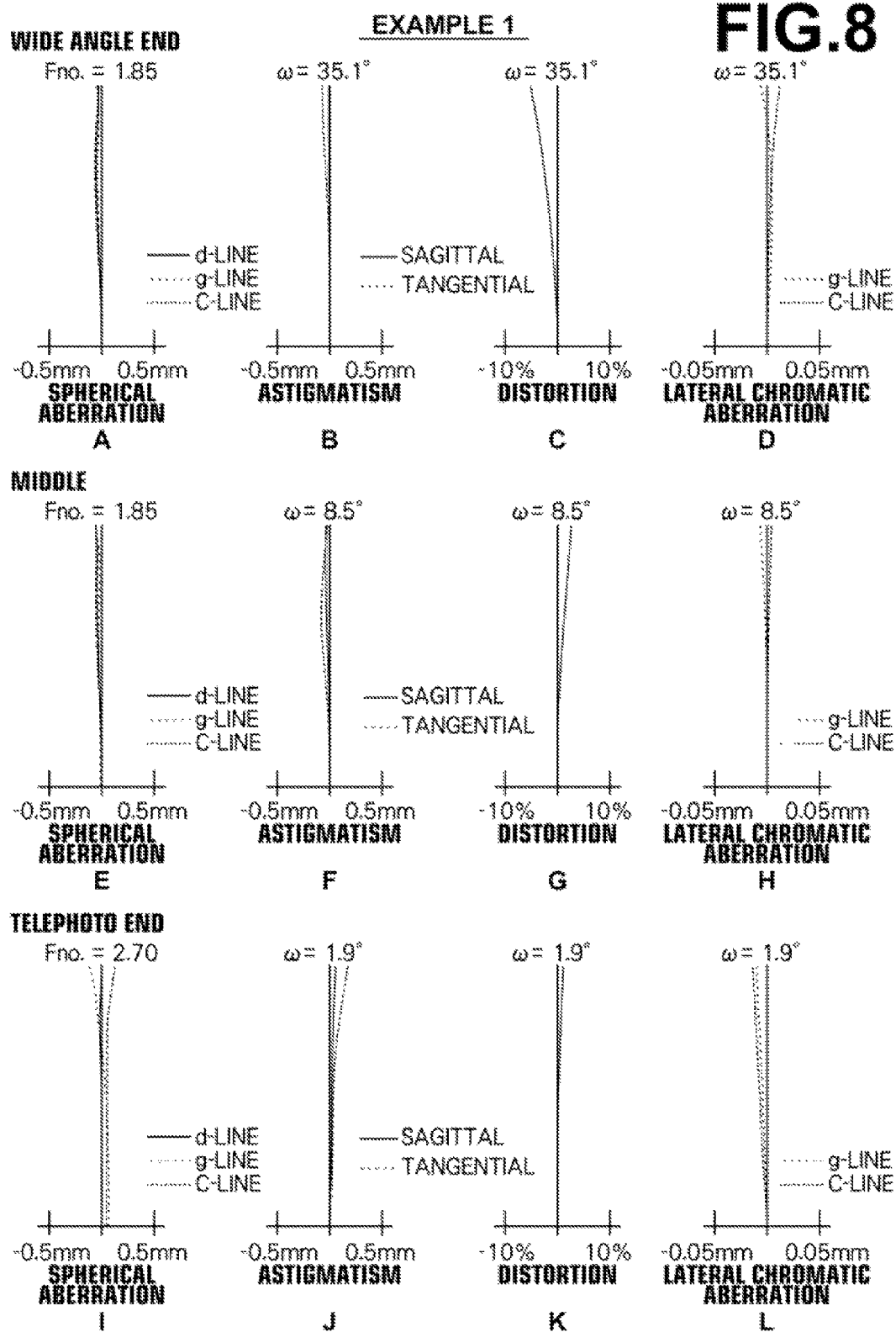
FIG. 8, Sections A through L are aberration diagrams of the zoom lens in Example 1 of the present invention.

FIG. 8, Sections A through D are aberration diagrams of a spherical aberration, astigmatism, distortion (distortion aberration), and a lateral chromatic aberration (a chromatic aberration of magnification) of the zoom lens of Example 1 at a wide angle end, respectively. FIG. 8, Sections E through H are aberration diagrams of a spherical aberration, astigmatism, distortion, and a lateral chromatic aberration of the zoom lens of Example 1 at a middle zoom position, respectively. FIG. 8, Sections I through L are aberration diagrams of a spherical aberration, astigmatism, distortion, and a lateral chromatic aberration of the zoom lens of Example 1 at a telephoto end, respectively. The aberration diagrams of FIG. 8, Sections A through L show aberrations when an object distance is 50 m.

The diagram of the spherical aberration illustrates aberrations for d-line (wavelength 587.6 nm), g-line (wavelength 436 nm), and C-line (wavelength 656.3). In the diagram of astigmatism, an aberration in a sagittal direction and an aberration in a tangential direction are indicated by a sold line and a broken line, respectively. In the diagram of distortion, an aberration for d-line is indicated by a solid line. The diagram of the lateral chromatic aberration illustrates aberrations for g-line and C-line. In the diagram of the spherical aberration, Fno. represents F-number, and in the other aberration diagrams ω represents a half angle of view.

TABLE 22

VALUE ABOUT FORMULA

| FORMULA | EXAMPLE 1 | EXAMPLE 2 | EXAMPLE 3 | EXAMPLE 4 | EXAMPLE 5 | EXAMPLE 6 | EXAMPLE 7 |
|---|---|---|---|---|---|---|---|
| (1) d12/fG1 | 0.18 | 0.21 | 0.19 | 0.36 | 0.39 | 0.40 | 0.39 |
| (2) vn | 27.5 | 27.5 | 28.5 | 23.8 | 25.4 | 25.4 | 23.8 |
| (3) vp | 81.5 | 86.1 | 81.7 | 83.3 | 83.3 | 83.3 | 81.8 |
| (4) fn/fp | −2.4 | −2.4 | −2.1 | −2.8 | −2.5 | −2.3 | −3.0 |
| (5) d23/fG1 | 0.11 | 0.11 | 0.12 | — | — | — | — |

Figure 9:
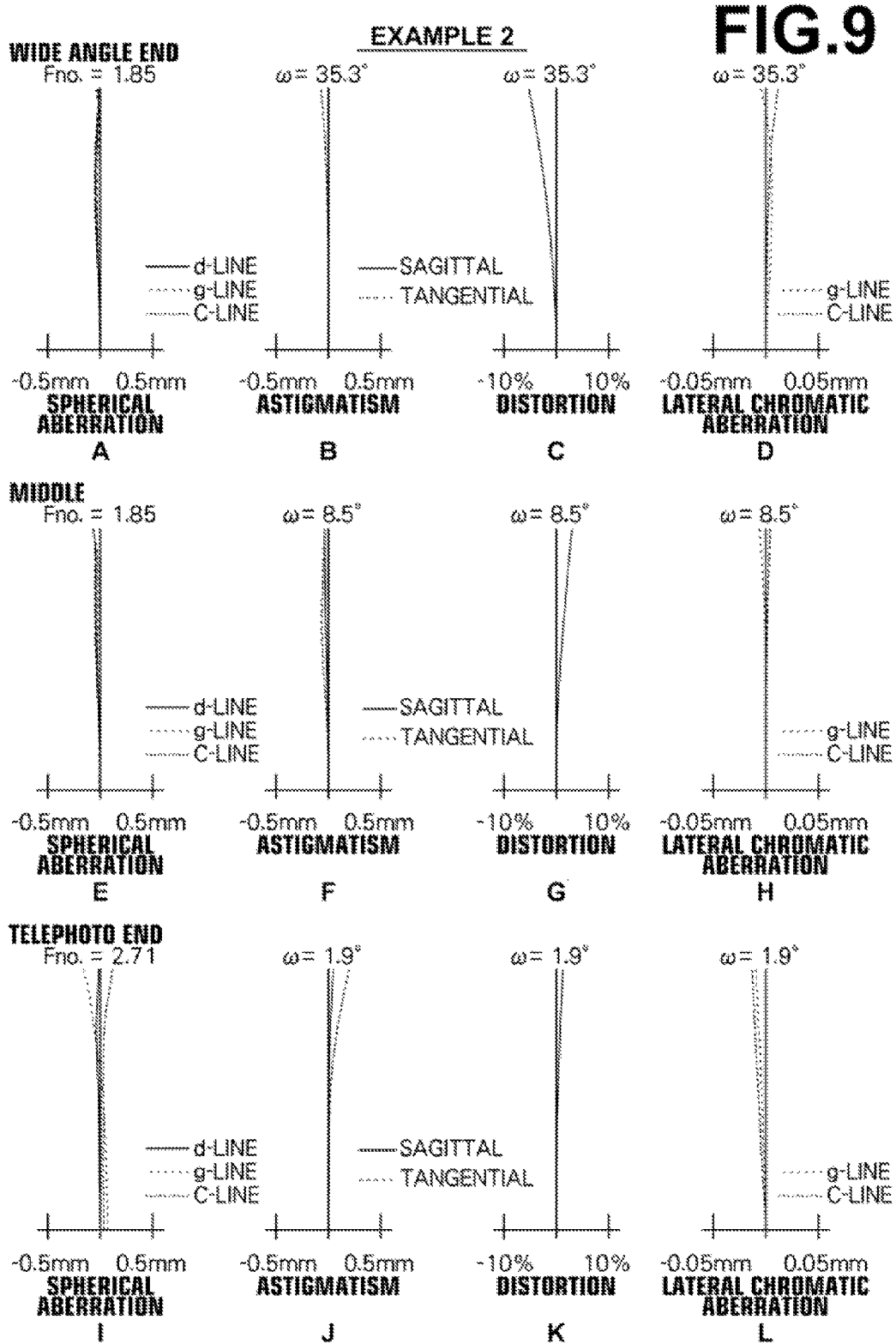
FIG. 9, Sections A through L are aberration diagrams of the zoom lens in Example 2 of the present invention.
Figure 10:
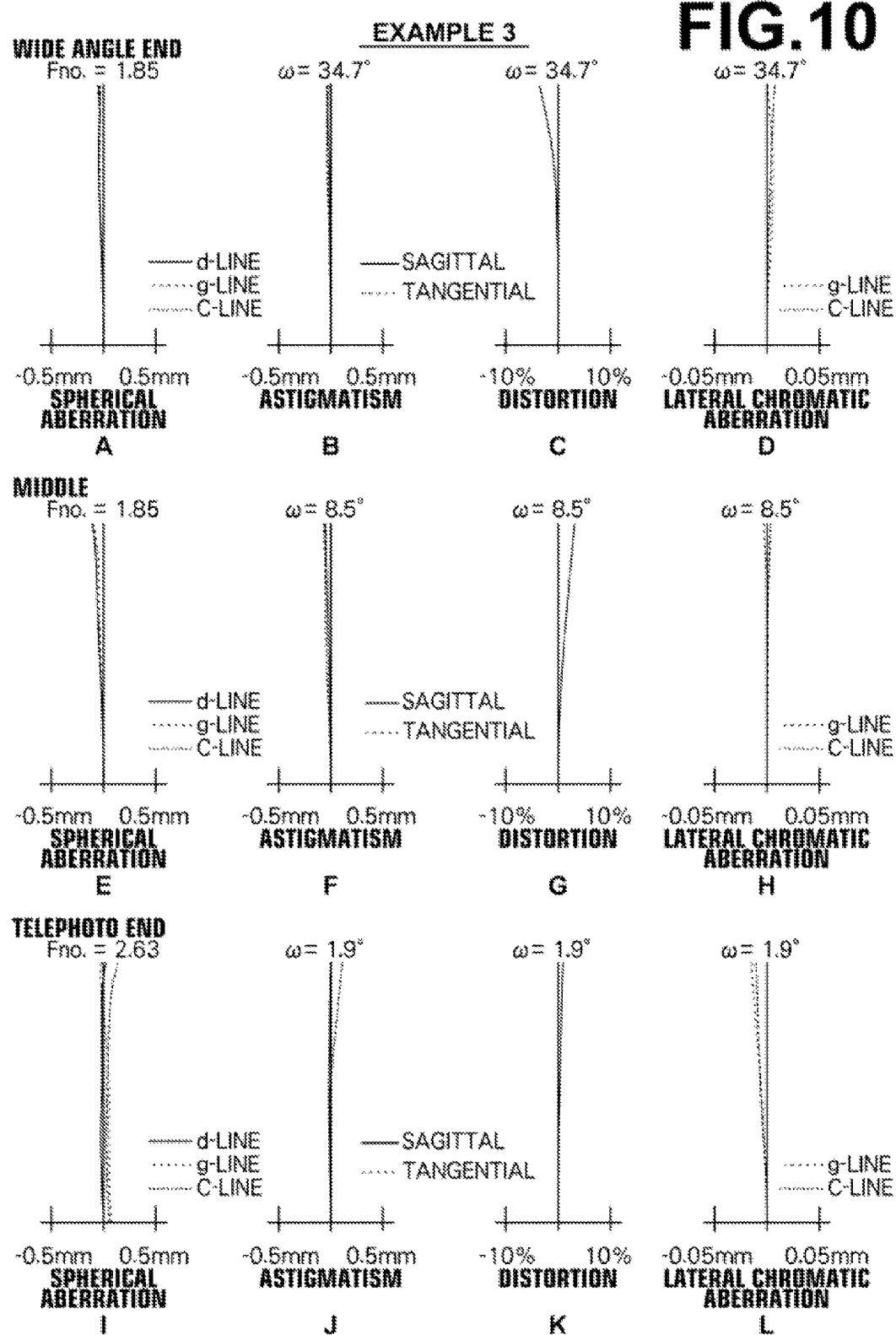
FIG. 10, Sections A through L are aberration diagrams of the zoom lens in Example 3 of the present invention.
Figure 11:
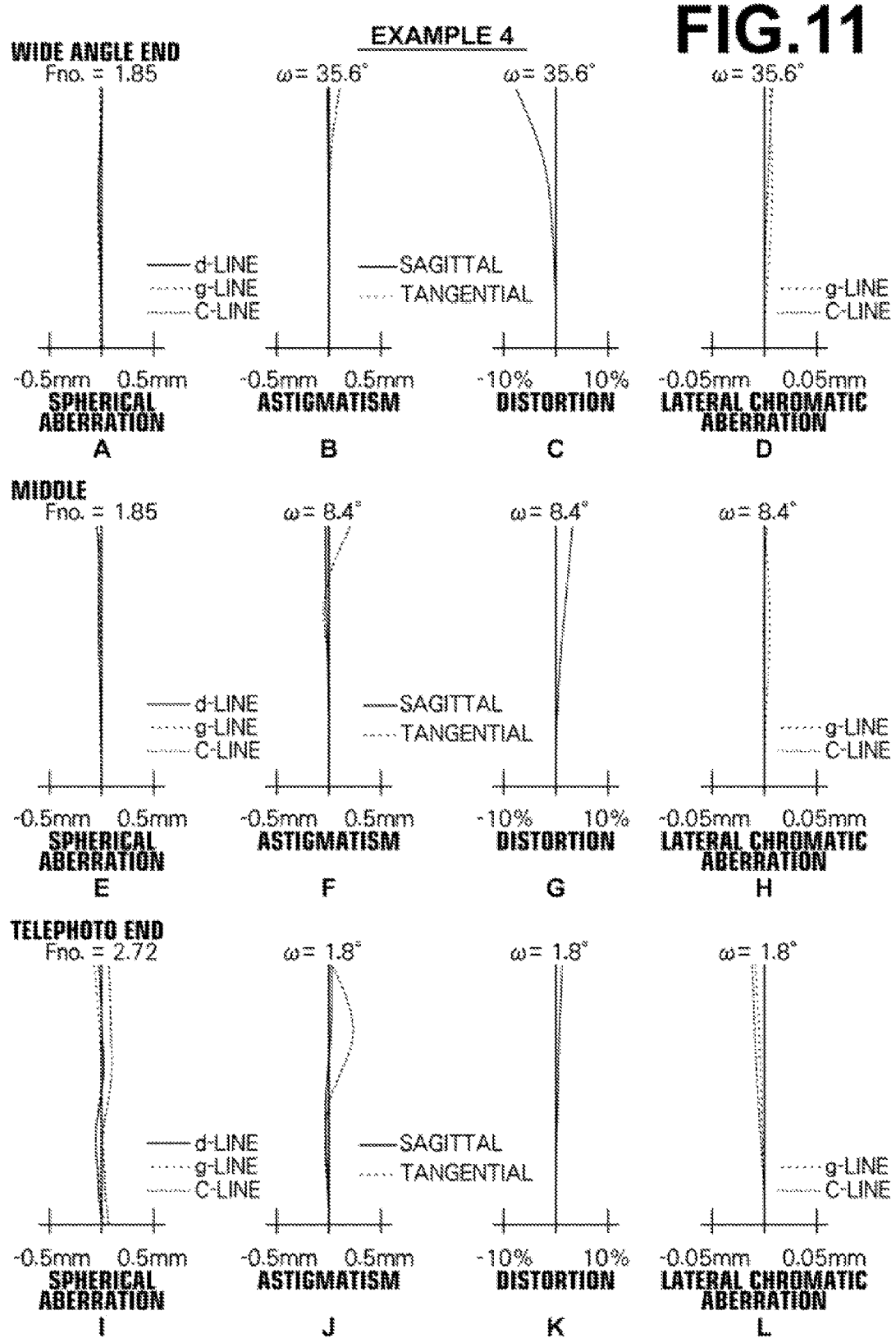
FIG. 11, Sections A through L are aberration diagrams of the zoom lens in Example 4 of the present invention.
Figure 12:
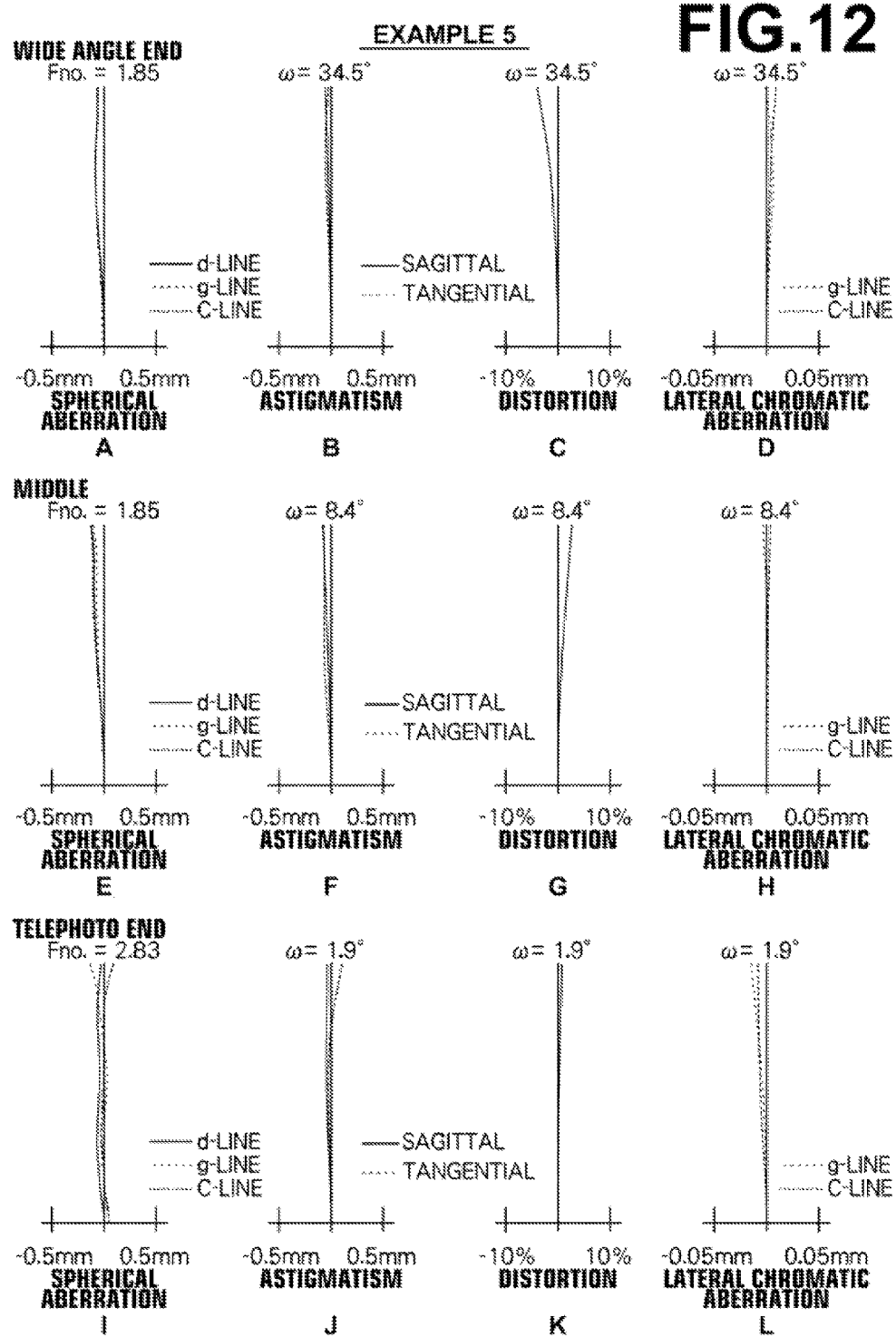
FIG. 12, Sections A through L are aberration diagrams of the zoom lens in Example 5 of the present invention.
Figure 13:
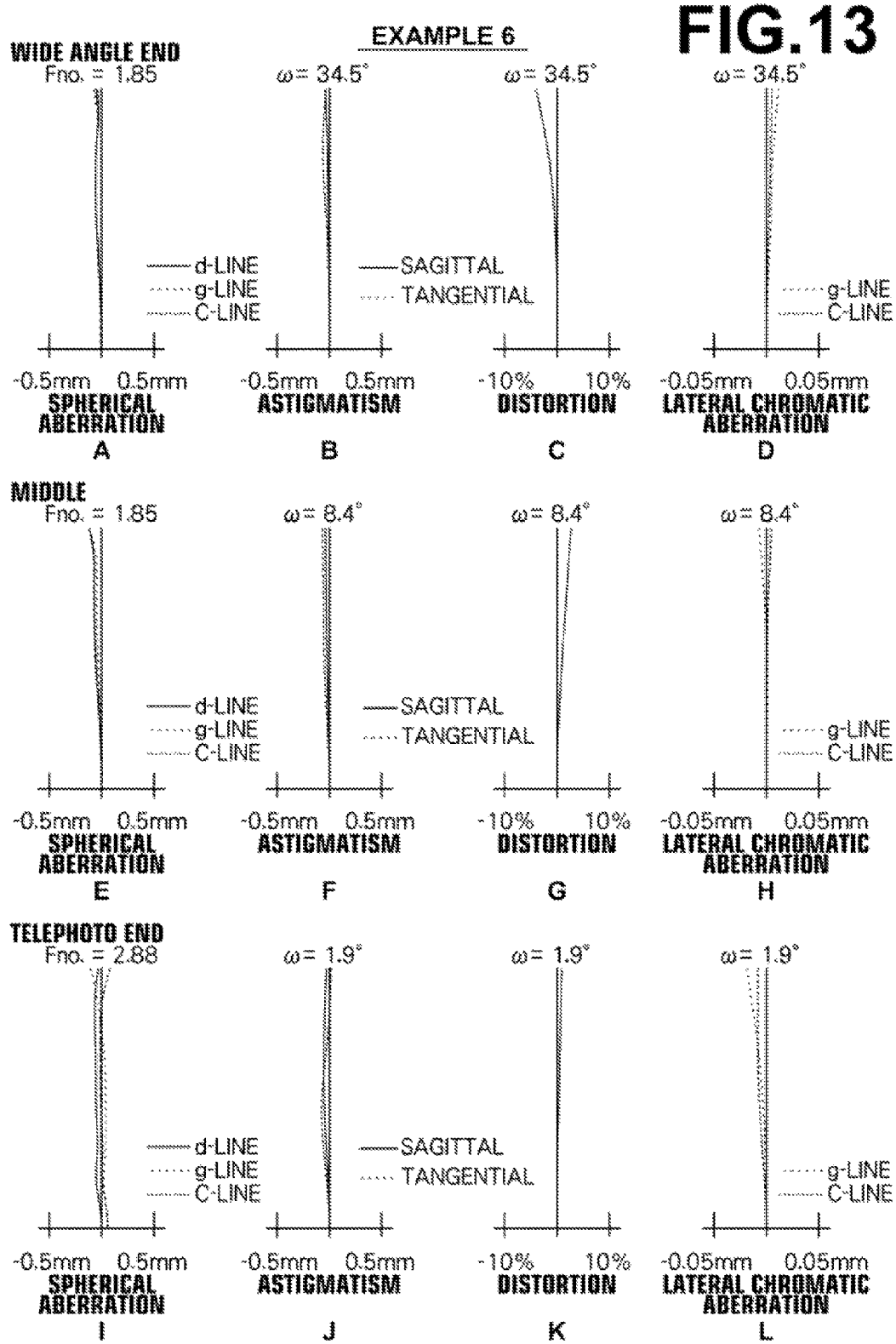
FIG. 13, Sections A through L are aberration diagrams of the zoom lens in Example 6 of the present invention.
Figure 14:
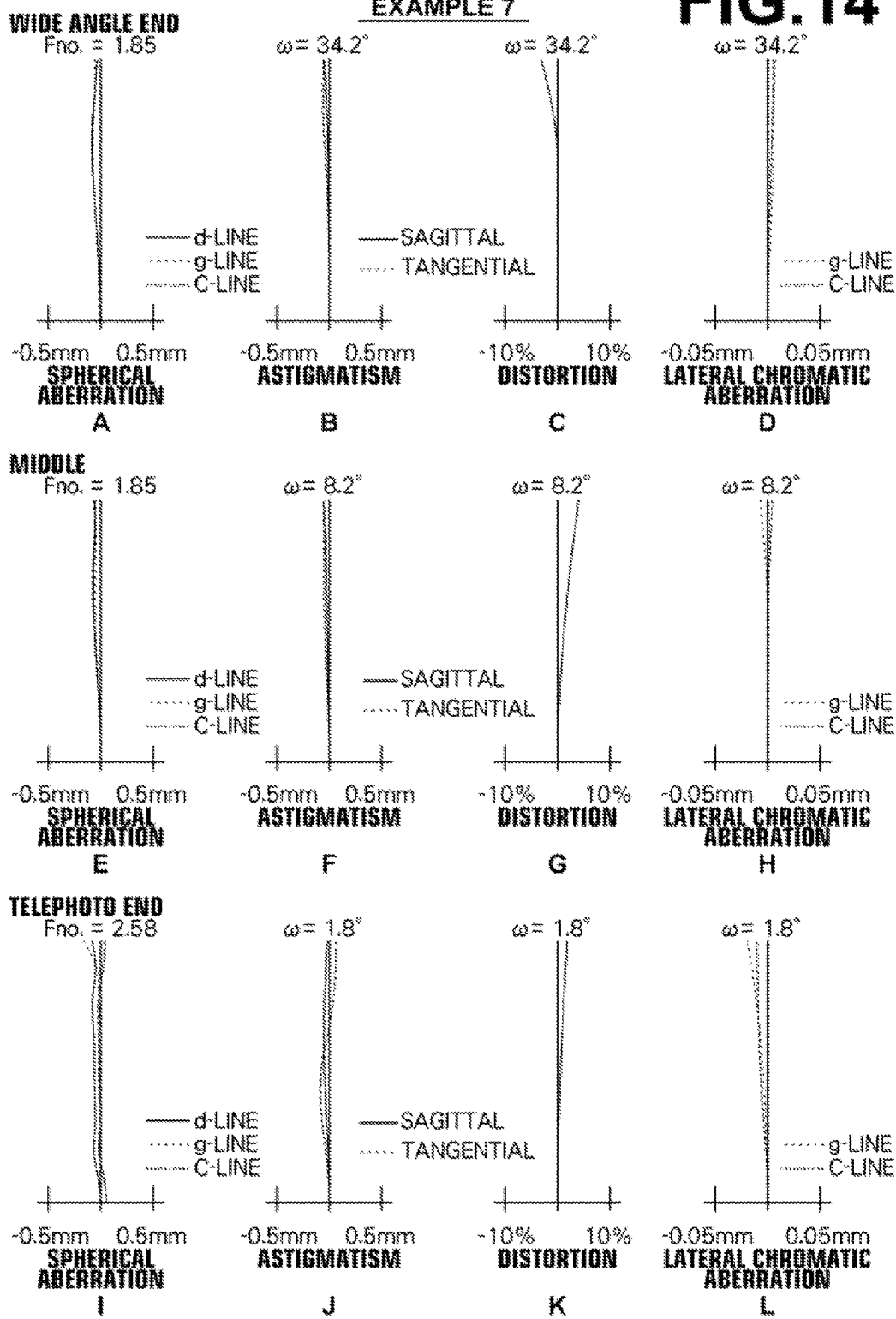
FIG. 14, Sections A through L are aberration diagrams of the zoom lens in Example 7 of the present invention.

Similarly, FIG. 9, Sections A through L, FIG. 10, Sections A through L, FIG. 11, Sections A through L, FIG. 12, Sections A through L, FIG. 13, Sections A through L, and FIG. 14, Sections A through L are aberration diagrams for the zoom lenses of Examples 2 through 7, respectively, when an object distance is 50 m.

As the above descriptions and data show, the zoom lenses of Examples 1 through 7 have high variable magnification ratios of about 17 times, and the size, the weight and the cost are reduced. Further, they have high optical performance in which various aberrations are corrected in an excellent matter for the entire range of variable magnification.

Figure 15:
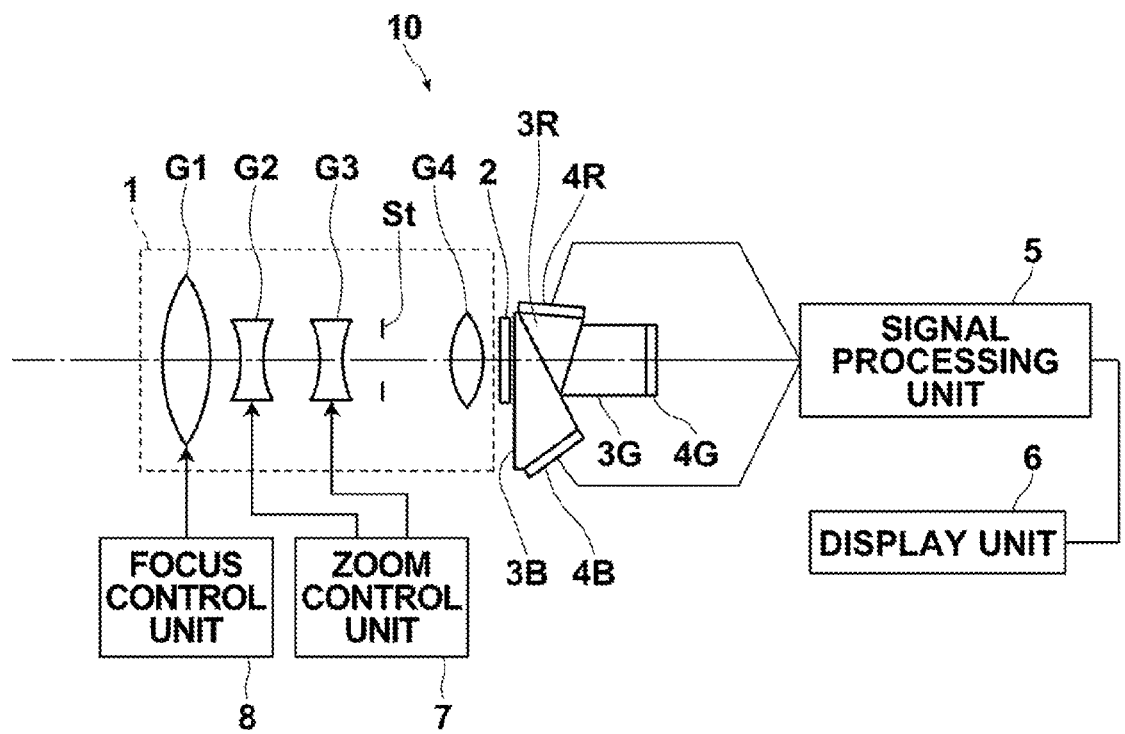
FIG. 15 is a schematic diagram illustrating the structure of an imaging apparatus according to an embodiment of the present invention.

FIG. 15 is a diagram illustrating the structure of a TV camera 10 using the zoom lens 1 according to an embodiment of the present invention, as an example of an imaging apparatus according to an embodiment of the present invention. FIG. 15 schematically illustrates positive first lens group G1, negative second lens group G2, negative third lens group G3, aperture stop St, and positive fourth lens group G4 included in the zoom lens 1.

The TV camera 10 includes the zoom lens 1, a filter 2 having a function of a low-pass filter, an infrared ray cut filter, or the like, and which is arranged on the image side of the zoom lens 1, color separation prisms 3R, 3G and 3B, which are arranged on the image side of the filter 2, and imaging devices 4R, 4G, and 4B provided on end surfaces of the color separation prisms, respectively. The imaging devices 4R, 4G and 4B convert an optical image formed by the zoom lens 1 into electrical signals. For example, a CCD, a CMOS or the like may be used. The imaging devices 4R, 4G and 4B are arranged in such a manner that the imaging planes of the imaging devices 4R, 4G and 4B match with the image plane of the zoom lens 1.

Further, the TV camera 10 includes a signal processing unit 5 for performing operation processing on output signals from the imaging devices 4R, 4G and 4B, a display unit 6 for displaying an image formed by the signal processing unit 5, a zoom control unit 7 for controlling variable magnification of the zoom lens 1, and a focus control unit 8 for adjusting the focus of the zoom lens 1. Here, the TV camera 10 illustrated in FIG. 15 is a so-called 3CCD-type imaging apparatus, which includes three imaging devices. However, the imaging apparatus of the present invention is not limited to this type, and the entire wavelength range may be imaged by a single imaging device.

So far, the present invention has been described by using embodiments and examples. However, the present invention is not limited to the aforementioned embodiments nor examples, and various modifications are possible. For example, the values of the curvature radius, a distance between surfaces, refractive index, Abbe number, and aspheric coefficients of each lens element are not limited to the values in the aforementioned examples of numerical values, but may be other values.

Further, as the embodiment of the imaging apparatus, a TV camera was used as an example, and illustrated in the drawing. However, the imaging apparatus of the present invention is not limited to this example. For example, the present invention may be applied to other imaging apparatuses, such as a video camera.

What is claimed is:

1. A zoom lens consisting of:
a first lens group having positive refractive power, and which is fixed during changing magnification;
a second lens group having negative refractive power, and which is moved during changing magnification;
a third lens group having negative refractive power for correcting a fluctuation of an image plane caused by changing magnification; and
a fourth lens group having positive refractive power, and which is fixed during changing magnification, which are in this order from an object side,
wherein the first lens group consists of a negative lens and a positive lens group consisting of three or less positive lenses in this order from the object side, and
wherein the negative lens in the first lens group has at least an aspherical surface, and at least one of the positive lens or lenses in the first lens group has at least an aspherical surface, and
wherein the following formula (1) is satisfied:

$$0.14 < d12/fG1 < 0.44 \qquad (1),\text{ where}$$

d12 is a distance on an optical axis between the negative lens in the first lens group and a positive lens immediately on the image side of the negative lens, and
fG1 is a focal length of the first lens group.

2. A zoom lens, as defined in claim 1, wherein the following formulas (2) and (3) are satisfied:

$$20.0 < vn < 31.5 \qquad (2);\text{ and}$$

$$78.0 < vp \qquad (3),\text{ where}$$

vn is an Abbe number of the negative lens in the first lens group with respect to d-line, and
vp is an average of Abbe numbers of the positive lens group with respect to d-line.

3. A zoom lens, as defined in claim 2, wherein the following formulas (2-1) and (3-1) are satisfied:

$$22.0 < vn < 29.0 \qquad (2\text{-}1);\text{ and}$$

$$80.0 < vp \qquad (3\text{-}1).$$

4. A zoom lens, as defined in claim 2, wherein the following formula (4) is satisfied:

$$-3.30 < fn/fp < -1.70 \qquad (4),\text{ where}$$

fn is a focal length of the negative lens in the first lens group, and
fp is a focal length of the positive lens group.

5. A zoom lens, as defined in claim 2, wherein the first lens group consists of a front group having negative refractive and a rear group having positive refractive power in this order from the object side, and
wherein focusing is performed by moving only the rear group.

6. A zoom lens, as defined in claim 2, wherein the first lens group consists of a plurality of sub-lens-groups, and
wherein at least two of the plurality of sub-lens-groups move independently of each other during focusing.

7. A zoom lens, as defined in claim 1, wherein the first lens group consists of a front group having negative refractive and a rear group having positive refractive power in this order from the object side, and
wherein focusing is performed by moving only the rear group.

8. A zoom lens, as defined in claim 1, wherein the first lens group consists of a plurality of sub-lens-groups, and
wherein at least two of the plurality of sub-lens-groups move independently of each other during focusing.

9. A zoom lens, as defined in claim 1, wherein the following formula (1-1) is satisfied:

$$0.16 < d12/fG1 < 0.42 \qquad (1\text{-}1).$$

10. An imaging apparatus comprising:
a zoom lens, as defined in claim 1; and
an imaging device that images an optical image formed by the zoom lens.

11. A zoom lens consisting of:
a first lens group having positive refractive power, and which is fixed during changing magnification;
a second lens group having negative refractive power, and which is moved during changing magnification;
a third lens group having negative refractive power for correcting a fluctuation of an image plane caused by changing magnification; and
a fourth lens group having positive refractive power, and which is fixed during changing magnification, which are in this order from an object side,
wherein the first lens group consists of a negative lens and a positive lens group consisting of three or less positive lenses in this order from the object side, and
wherein the negative lens in the first lens group has at least an aspherical surface, and at least one of the positive lens or lenses in the first lens group has at least an aspherical surface, and
wherein the following formula (1) is satisfied:

$$0.14 < d12/fG1 < 0.44 \quad (1),$$

where
d12 is a distance on an optical axis between the negative lens in the first lens group and a positive lens immediately on the image side of the negative lens, and
fG1 is a focal length of the first lens group, and wherein the following formula (4) is satisfied:

$$-3.30 < fn/fp < -1.70 \quad (4),$$

where
fn is a focal length of the negative lens in the first lens group, and
fp is a focal length of the positive lens group.

12. A zoom lens, as defined in claim 11, wherein the following formula (4-1) is satisfied:

$$-3.10 < fn/fp < -1.90 \quad (4-1).$$

13. A zoom lens, as defined in claim 11, wherein the first lens group consists of a front group having negative refractive and a rear group having positive refractive power in this order from the object side, and
wherein focusing is performed by moving only the rear group.

14. A zoom lens, as defined in claim 11, wherein the first lens group consists of a plurality of sub-lens-groups, and
wherein at least two of the plurality of sub-lens-groups move independently of each other during focusing.

* * * * *